(12) United States Patent
Nagasawa et al.

(10) Patent No.: US 12,377,775 B2
(45) Date of Patent: Aug. 5, 2025

(54) VEHICLE CONTROL METHOD AND VEHICLE CONTROL DEVICE

(71) Applicant: Nissan Motor Co., Ltd., Yokohama (JP)

(72) Inventors: Yuji Nagasawa, Kanagawa (JP); Yohei Taniguchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 563 days.

(21) Appl. No.: 17/626,526

(22) PCT Filed: Aug. 25, 2020

(86) PCT No.: PCT/JP2020/031982
§ 371 (c)(1),
(2) Date: Jan. 12, 2022

(87) PCT Pub. No.: WO2022/044112
PCT Pub. Date: Mar. 3, 2022

(65) Prior Publication Data
US 2022/0234497 A1    Jul. 28, 2022

(51) Int. Cl.
*B60Q 1/42*    (2006.01)
*G06V 20/56*    (2022.01)

(52) U.S. Cl.
CPC ............. *B60Q 1/42* (2013.01); *G06V 20/588* (2022.01)

(58) Field of Classification Search
CPC ............................... B60Q 1/42; G06V 20/588
USPC ............................................................ 701/1
See application file for complete search history.

(56) References Cited

U.S. PATENT DOCUMENTS

| | | | |
|---|---|---|---|
| 2012/0271510 A1* | 10/2012 | Seymour | B60Q 1/46 701/36 |
| 2013/0184926 A1* | 7/2013 | Spero | B60W 30/143 701/25 |
| 2016/0114722 A1* | 4/2016 | Kim | B60Q 1/42 701/36 |
| 2016/0311364 A1* | 10/2016 | Fendt | B60Q 1/346 |
| 2017/0057404 A1* | 3/2017 | Park | H05B 47/115 |
| 2017/0131719 A1* | 5/2017 | Micks | G08G 1/161 |

(Continued)

FOREIGN PATENT DOCUMENTS

| | | | |
|---|---|---|---|
| DE | 102013217776 A1 * | 3/2015 | ............... B60Q 1/40 |
| JP | 2010-18184 A | 1/2010 | |

(Continued)

OTHER PUBLICATIONS

Destination Nissan, How to use your turn signal properly (Year: 2018).*

*Primary Examiner* — Anne Marie Antonucci
*Assistant Examiner* — Luis G Del Valle
(74) *Attorney, Agent, or Firm* — Global IP Counselors, LLP

(57) ABSTRACT

An autonomous travel controller detects whether a host vehicle is carrying out a first course change for changing a course in a direction indicated by a turn indicator. Upon detecting that the host vehicle is carrying out the first course change, detecting whether there is a road that enables a second course change for changing the course of the host vehicle that branches from the road after the first course change. When a road that enables the second course change is detected, the autonomous travel controller turns the turn indicator off.

5 Claims, 8 Drawing Sheets

(56) References Cited

U.S. PATENT DOCUMENTS

| | | | |
|---|---|---|---|
| 2019/0047469 A1* | 2/2019 | Nishiguchi | B60Q 1/40 |
| 2019/0084572 A1* | 3/2019 | Oishi | B60Q 1/40 |
| 2019/0149813 A1* | 5/2019 | Sun | G03B 43/00 |
| | | | 348/187 |
| 2019/0187719 A1* | 6/2019 | El-Khatib | G08G 1/167 |
| 2019/0256098 A1* | 8/2019 | Yanagihara | B60W 30/09 |

FOREIGN PATENT DOCUMENTS

| | | | |
|---|---|---|---|
| JP | 2010018184 A * | 1/2010 | |
| JP | 2010-76460 A | 4/2010 | |
| JP | 2010-184543 A | 8/2010 | |
| JP | 2018-103769 A | 7/2018 | |

\* cited by examiner

VEHICLE CONTROL METHOD AND VEHICLE CONTROL DEVICE

CROSS-REFERENCE TO RELATED APPLICATIONS

This application is a U.S. national stage application of International Application No. PCT/JP2020/031982, filed on Aug. 25, 2020.

BACKGROUND

Technical Field

The present invention relates to a vehicle control method and a vehicle control device that turns off a turn indicator after a host vehicle changes lanes.

Background Information

A lane-change assist device is known in which, when a driver of a host vehicle operates a turn indicator lever in order to request lane-change assist, steering torque is applied to a steering mechanism, thereby assisting the steering operation of the driver (for example, see Japanese Laid-Open Patent Application No. 2018-103769 referred to as Patent Document 1). This lane-change assist device has a camera unit that captures an image of the area ahead of the host vehicle that includes the boundary line between the original lane before the lane-change is made and a target lane into which the lane-change is made, wherein the captured image data is analyzed in order to detect the boundary line and turn off the blinking of the turn indicator when the host vehicle passes the boundary line.

SUMMARY

However, because a camera unit that photographs the area ahead of the vehicle cannot detect boundary lines on roads on which boundary lines have become weathered and faded, on roads without boundary lines, or on roads too wide for the boundary lines to fall within the photographing range of the camera, the turn indicator is not turned off after changing course, such as after a lane change. Therefore, on a road on which another change of course is possible after changing course, the blinking of the turn indicator may continue.

The problem to be solved by the present invention is to provide a vehicle control method and a vehicle control device that can turn off the turn indicator after a change of course, even on a road on which the boundary line cannot be detected by a camera that photographs the area ahead of the vehicle.

The present invention solves the aforementioned problem in that when a host vehicle is carrying out a first course change for changing course in the direction indicated by a turn indicator, it is detected, from an image captured by an imaging device that photographs the area ahead of the host vehicle, whether there is a road that, as a road that enables a second course change for changing the course of the host vehicle, branches from the road after the first course change, and when a road that enables the second course change is detected, the turn indicator is turned off.

By means of the present invention, because the turn indicator is turned off, if, after a change of course of the host vehicle, there is another road to which the course can be changed, the blinking of the turn indicator can be turned off even on a road on which boundary lines cannot be detected by an imaging device that photographs the area ahead of the vehicle.

BRIEF DESCRIPTION OF THE DRAWINGS

Referring now to the attached drawings which form a part of this original disclosure.

DETAILED DESCRIPTION OF EMBODIMENTS

Figure 1:
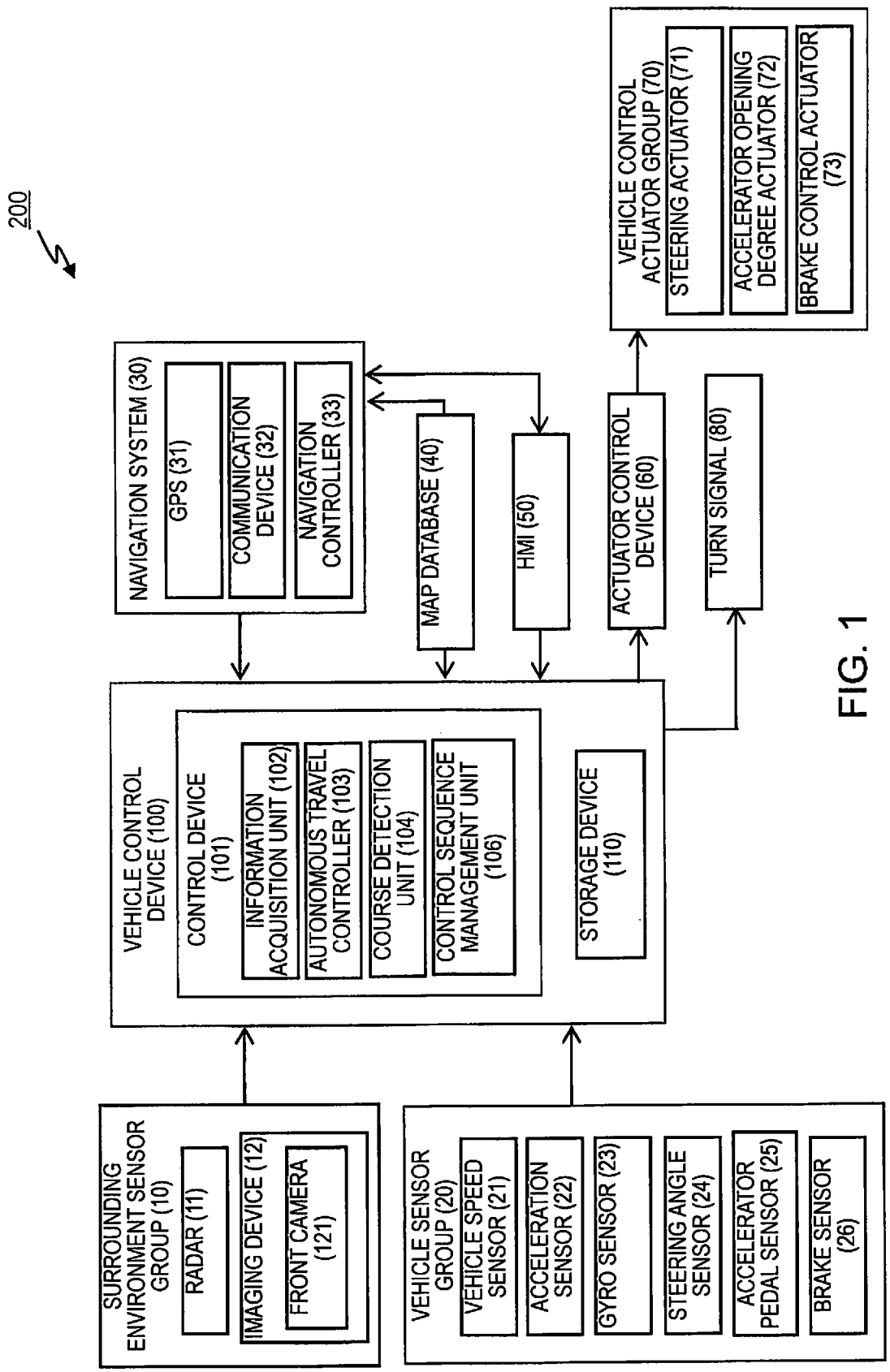
FIG. 1 is a block diagram showing one example of a vehicle system that includes a vehicle control device according to the present embodiment.

Embodiments of the present invention will be described below based on the drawings. FIG. 1 is a block diagram showing one example of a vehicle system 200 implementing the vehicle control method and the vehicle control device according to the present invention. The vehicle system 200 according to the present embodiment is mounted on a vehicle. The vehicle system 200 carries out autonomous travel control, which causes a vehicle to travel autonomously without depending on a driver's driving operation. The autonomous travel control executed by the vehicle system 200 can change the course of the vehicle. Changing course in the present embodiment refers not to changing the direction of travel of the vehicle, such as making a left or right turn, but to changing the road (course) on which the vehicle travels. Moreover, roads include lanes, and thus a change of course in the present embodiment includes lane changes.

As shown in FIG. 1, the vehicle system 200 according to the present embodiment comprises a surrounding environment sensor group 10, a vehicle sensor group 20, a navigation system 30, a map database 40, an HMI (Human Machine Interface) 50, an actuator control device 60, a vehicle control actuator group 70, a turn indicator 80, and a vehicle control device 100. These devices or systems are connected to a CAN (Controller Area Network) and other on-board LANs for mutual information exchange.

The surrounding environment sensor group 10 is a sensor group for detecting the state (external state) around the host vehicle, and is provided in the host vehicle. As shown in FIG. 1, the surrounding environment sensor group 10 includes, but is not limited to, a radar 11 and an imaging device 12, for example.

The radar 11 detects objects present around the host vehicle. Examples of the radar 11 include, but are not limited to, a millimeter wave radar, a laser radar, an ultrasonic radar, a laser range finder, and the like. For example, the radar 11 transmits radio waves to the periphery of the host vehicle and receives radio waves reflected by an object in order to detect the object. Specifically, the radar 11 detects the direction of and the distance to the object. The radar 11 also detects the relative speed (including the direction of movement) of the object with respect to the host vehicle, based on the direction of the object and the temporal change of distance to the object. The detection result detected by the radar 11 is output to the vehicle control device 100.

In the present embodiment, the radar 11 targets all directions from the center of the host vehicle. For example, the radar 11 is composed of a front radar provided in the front of the host vehicle that detects objects in the area ahead of the host vehicle, side radars provided on the sides of the host vehicle that detect objects in the area to the sides of the host vehicle, and a rear radar provided in the rear of the vehicle that detects objects in the area behind the host vehicle. The number and type of the radars 11 provided in the host vehicle are not particularly limited.

The imaging device 12 photographs the periphery of the host vehicle. An example of the imaging device 12 includes, but is not limited to, a camera equipped with imaging elements such as a CCD or CMOS. Images captured by the imaging device 12 are output to the vehicle control device 100.

In the present embodiment, the imaging device 12 targets all directions from the center of the host vehicle. For example, the imaging device 12 is composed of a front camera 121 provided in the front of the host vehicle that photographs the area ahead of the host vehicle, side cameras provided on the sides of the host vehicle that photograph the area to the sides of the host vehicle, and a rear camera provided in the rear of the vehicle that photographs the area behind the host vehicle. It is sufficient if the host vehicle of the present embodiment is equipped with at least the front camera 121, and the arrangement positions and number of other cameras are not particularly limited.

Examples of objects to be detected by the surrounding environment sensor group 10 include pedestrians, bicycles, motorcycles, automobiles (hereinafter referred to as other vehicles), road obstacles, and traffic lights. For example, if another vehicle traveling along the travel direction of the host vehicle is present around the host vehicle, the radar 11 detects the direction of and distance to the other vehicle relative to the location of the host vehicle, and the relative speed of the other vehicle relative to the host vehicle. In addition, the imaging device 12 captures an image from which it is possible to identify the type, size, and shape of the other vehicle, as well as road markings, etc.

In addition, if the host vehicle is traveling on a specific lane from among a plurality of lanes, the radar 11 detects lane markings that separate the lane in which the host vehicle is traveling and an adjacent lane, as well as the distance from the host vehicle to the lane marking. The front camera 121 of the imaging device 12 captures an image from which it is possible to identify the type of lane marking. The captured image of the front camera 121 is analyzed by the vehicle control device 100 in order to detect the type of lane marking and the distance from the host vehicle to the lane marking. If there are lane markings on either side of the host vehicle, the radar 11 and the front camera 121 detect the distance from the host vehicle to the lane markings on each side. The front camera 121 corresponds to one example of the imaging device of the present invention. In the following description, the lane in which the host vehicle is traveling is also referred to as the host vehicle lane, and a lane located next to the host vehicle lane is referred to as the adjacent lane.

The vehicle sensor group 20 is a sensor group for detecting the state (internal state) of the host vehicle. As shown in FIG. 1, the vehicle sensor group 20 includes, but is not limited to, a vehicle speed sensor 21, an acceleration sensor 22, a gyro sensor 23, a steering angle sensor 24, an accelerator pedal sensor 25 and a brake sensor 26, for example. The vehicle sensor group 20 corresponds to one example of the vehicle sensor of the present invention.

The vehicle speed sensor 21 measures the rotation speed of the drive system, such as the drive shaft, in order to detect the travel speed of the host vehicle based on the measurement result. For example, the vehicle speed sensor 21 is provided on a wheel of the host vehicle, or a drive shaft that rotates integrally with the wheel. The acceleration sensor 22 detects the acceleration of the host vehicle. The acceleration sensor 22 includes a longitudinal acceleration sensor that detects the acceleration of the host vehicle in the front-rear direction, and a lateral acceleration sensor that detects the lateral acceleration of the host vehicle. The gyro sensor 23 detects the turning speed of the host vehicle, that is, the amount of angular movement of the host vehicle per unit time (angular velocity). The steering angle sensor 24 detects the steering angle of the steering wheel. The steering angle sensor 24 is provided on the steering shaft of the host vehicle, for example. The accelerator pedal sensor 25 detects the amount of depression of the accelerator pedal (position of the accelerator pedal). For example, the accelerator pedal sensor 25 is provided on the shaft portion of the accelerator pedal. The brake sensor 26 detects the amount of depression of the brake pedal (position of the brake pedal). For example, the brake sensor 26 is provided on the shaft portion of the brake pedal.

The detection result detected by the vehicle sensor group 20 is output to the vehicle control device 100. The detection result includes, for example, the host vehicle's speed, acceleration (including both longitudinal acceleration and lateral acceleration), angular velocity, amount of depression of the accelerator pedal, and amount of depression of the brake pedal.

The navigation system 30 indicates a travel route from the current location of the host vehicle to the destination based on current location information of the host vehicle in order to guide an occupant (including the driver) of the host vehicle. Map information is input to the navigation system 30 from the map database 40, and destination information is input from an occupant of the host vehicle via the HMI 50. The navigation system 30 generates a travel route for the host vehicle based on this input information. The navigation system 30 then outputs information regarding the travel route of the host vehicle to the vehicle control device 100, and presents this information to the occupant of the host vehicle via the HMI 50. The travel route from the current location to the destination is thereby presented to the occupant.

As shown in FIG. 1, the navigation system 30 comprises a GPS device 31, a communication device 32, and a navigation controller 33.

The GPS device 31 acquires position information indicating the current location of the host vehicle (Global Positioning System, GPS). Using a receiver, the GPS device 31 receives radio waves transmitted from a plurality of GPS satellites constituting a GNSS (Global Navigation Satellite System), thereby acquiring host vehicle location information. In addition, the GPS device 31 can receive radio waves periodically transmitted from a plurality of GPS satellites in order to detect changes in the host vehicle location information.

The communication device 32 acquires surrounding conditions of the host vehicle from the outside. For example, the communication device 32 is a device that can communicate with a server or a system provided outside of the host vehicle. The communication device 32 may communicate with a communication device mounted on another vehicle.

For example, the communication device 32 acquires road traffic information from a road traffic information communication system (Vehicle Information and Communication System, VICS (registered trademark), the same applies below) by means of FM multiplex broadcasting, an information transmission device (beacon) provided on the road, or the like. Road traffic information includes, for example, lane-specific traffic congestion information, accident information, disabled vehicle information, construction information, speed limit information, lane closure information, and the like. The road traffic information does not necessarily include all of the types of information described above, and it suffices if at least one of the above-described types of information is included.

Moreover, for example, if the communication device 32 includes a function for communicating with a communication device mounted on another vehicle, the communication device acquires the vehicle speed information and the position information of the other vehicle. Communication carried out between the host vehicle and another vehicle is referred to as vehicle-to-vehicle communication. The communication device 32 may acquire information pertaining to another vehicle such as the vehicle speed as host vehicle vicinity information by means of vehicle-to-vehicle communication.

The communication device 32 may acquire from the VICS information that includes the location, vehicle speed, and travel direction of another vehicle as host vehicle vicinity information.

The navigation controller 33 is a computer that generates a travel route from the current location of the host vehicle to the destination. For example, the navigation controller 33 is composed of a ROM (Read-Only Memory) for storing a program for generating the travel route, a CPU (Central Processing Unit) that executes the program stored in ROM, and a RAM (Random-Access Memory) that functions as an accessible storage device.

The navigation controller 33 inputs information on the current location of the host vehicle from the GPS device 31, road traffic information from the communication device 32, map information from the map database 40, and host vehicle destination information the from the HMI 50. Assume, for example, that the occupant of the host vehicle sets a destination of the host vehicle via the HMI 50. The navigation controller 33 sets a lane-specific travel route for the host vehicle from the current location to the destination based on the host vehicle location and destination information, map information, and road traffic information. The navigation controller 33 outputs to the vehicle control device 100 and presents to the occupant of the host vehicle via the HMI 50 the generated travel route information.

In the present embodiment, the host vehicle travel route may be any route by which the host vehicle can reach the destination from its current location, and other conditions are not limited. For example, the navigation controller 33 may generate the host vehicle travel route in accordance with conditions set by the occupant. For example, if the occupant sets a toll road preference for reaching the destination, the navigation controller 33 may generate a travel route that uses toll roads based on the map information. In addition, for example, the navigation controller 33 may generate a host vehicle travel route based on road traffic information. For example, if there is traffic congestion on the shortest route to the destination, the navigation controller 33 may search for detour routes and select from a plurality of searched detour routes the route that requires the least amount of time as the travel route.

Map information is stored in the map database 40. Map information includes road information and traffic rule information. The road information and the traffic rule information are defined by nodes and links (also referred to as road links) that connect the nodes. Links are identified at the lane level.

Road information is information related to roads on which the vehicle can travel. Each road link is associated with information related to the road, such as road type, road width, road shape, whether through traffic is possible, right-of-way, whether passing is possible (whether entering an adjacent lane is possible), whether a lane change is possible, and the like, but road link associated information is not limited to these examples. For example, each road link is associated with information related to intersections, such traffic light installation locations, intersection locations, directions from which intersections can be approached, type of intersection, etc.

Traffic rule information includes traffic rules that should be complied with when a vehicle is traveling. Examples of traffic rules include, but is not limited to, stops, no parking/stopping, reduce speed, speed limit, maintain present lane, etc., on the route. Each road link is associated with information regarding the traffic rules in the section defined by the road link. For example, information for maintaining lanes is associated with the road links in sections in which lane changes are prohibited. Traffic rule information may be associated with nodes or specific points on a map (latitude, longitude) in addition to a road link.

In addition, traffic rule information may include information related to traffic lights in addition to information related to traffic rules. For example, information pertaining to the current color of the traffic light and/or to the traffic light cycle may be associated with the road link of an intersection at which a traffic light is installed. Information related to traffic lights may be acquired from the VICS by the communication device 32 or from an information transmission device (for example, an optical beacon) installed on the road. Traffic light display information changes over time. Therefore, traffic rule information is updated at prescribed intervals.

The map information stored in the map database 40 may be high-precision map information suitable for autonomous travel control. High-precision map information is acquired by communicating with a server or system provided outside of the host vehicle, for example. In addition, high-precision map information may be generated on demand, based on information (for example, information regarding objects detected by the radar 11, images of the host vehicle surroundings photographed by the imaging device 12) acquired in real time using the surrounding environment sensor group 10.

Further, in the present embodiment, a configuration in which the vehicle system 200 is equipped with the map database 40 is described as an example, but the map database 40 may be provided outside of the vehicle system 200. For example, map information may be stored in advance in a portable storage device (such as an external HDD or flash memory). In this case, by electrically connecting the vehicle control device 100 and the storage device in which the map information is stored, the storage device functions as the map database 40.

The HMI 50 is an interface for outputting and inputting information between the occupant of the host vehicle and the vehicle system 200. Examples of the HMI 50 include, but are not limited to, buttons, switches, and touch panels operated by the occupant, a display for displaying text or image information, a speaker that outputs sounds such as music or voice, a microphone for inputting the occupant's voice, etc.

Sending and receiving information via the HMI 50 will be described. For example, when an occupant inputs the destination into the HMI 50 in order to set the destination, the destination information is output from the HMI 50 to the navigation system 30. The navigation system 30 thereby acquires the host vehicle destination information. In addition, for example, when the navigation system 30 generates a travel route to the destination, the travel route information is output from the navigation system 30 to the HMI 50. The HMI 50 then outputs the travel route information to a display and/or a speaker. The information on the travel route to the destination is thus presented to the occupant of the host vehicle. Examples of information on the travel route to the destination include, but are not limited to, route guidance and the time required to reach the destination.

Further, for example, when the occupant inputs a command to execute a lane change to the HMI 50 in order to cause the host vehicle to change lanes, the command to execute the lane change is output from the HMI 50 to the vehicle control device 100. The vehicle control device 100 can thereby start the control process for changing lanes. In addition, for example, when the vehicle control device 100 sets a target trajectory for a lane change, information pertaining to the target trajectory is output from the vehicle control device 100 to the HMI 50. The HMI 50 then outputs the information pertaining to the target trajectory to a display and/or a speaker. The information pertaining to the target trajectory for changing lanes is thereby presented to the occupant of the host vehicle. Examples of information pertaining to the target trajectory for changing lanes include, but are not limited to, an approach position specified on an adjacent lane and a target trajectory for changing lanes. The target trajectory and the approach position will be described further below.

The actuator control device 60 controls host vehicle travel. The actuator control device 60 comprises a steering control mechanism, an accelerator pedal control mechanism, a brake control mechanism, a drive unit control mechanism, and the like. The drive unit is an engine and a motor that act as the drive source of the vehicle. A control signal from the vehicle control device 100, described further below, is input to the actuator control device 60. The actuator control device 60 controls the vehicle control actuator group 70 in accordance with the control signal from the vehicle control device 100, thereby realizing autonomous travel control of the host vehicle. For example, when a control signal for causing the host vehicle to move from the host vehicle lane to an adjacent lane is input to the actuator control device 60, the actuator control device 60 calculates, in accordance with the control signal, the steering angle required for the movement of the host vehicle, and the accelerator depression amount or the brake depression amount in accordance with the movement speed. The actuator control device 60 outputs the various calculated parameters to the vehicle control actuator group 70.

The control of each mechanism may be carried out completely automatically or in the form of assisting the driver's driving operations. The control of each mechanism can be interrupted or stopped by means of a driver intervention operation. The travel control method used by the actuator control device 60 is not limited to the control method described above, and other known methods may be used.

The vehicle control actuator group 70 is a group of various actuators for driving the host vehicle. As shown in FIG. 1, examples of the vehicle control actuator group 70 include, but are not limited to, a steering actuator 71, an accelerator opening degree actuator 72, and a brake control actuator 73.

The steering actuator 71 controls the steering direction and the steering amount of the steering wheel of the host vehicle in accordance with a signal input from the actuator control device 60. The accelerator opening degree actuator 72 controls the accelerator opening degree of the host vehicle in accordance with a signal input from the actuator control device 60. The brake control actuator 73 controls the braking operation of the host vehicle in accordance with a signal input from the actuator control device 60.

When the host vehicle changes its direction of travel or changes course, the turn indicator 80 indicates such changes of direction externally to the host vehicle. Changes in travel direction include right turns and left turns. Changes of course include lane changes and course changes at branch points, merge points, toll plazas, and the like. The turn indicator 80 has, for example, turn indicator lights provided on the left and right sides of the front and rear ends of the host vehicle, and a turn indicator control circuit that controls each of the turn indicator lights. The turn indicator control circuit blinks the left-side turn indicator light when a turn indicator switch (not shown) is operated for the left turn signal position. In addition, the turn indicator control circuit blinks the right-side turn indicator light when the turn indicator switch is operated for the right turn signal position. The turn indicator control circuit turns off the turn indicator light when the turn indicator switch is operated to a neutral position between the left turn signal position and the right turn signal position. The HMI 50 described above includes the turn indicator switch.

In addition, in the present embodiment, a control signal from the vehicle control device 100 is input to the turn indicator control circuit. The control signal is a signal for operating the turn indicator 80, and includes a signal for blinking a turn indicator light that is off (also referred to as a flashing signal), and a signal for turning off a blinking turn indicator light (also referred to as a turn-off indicator signal). For example, when a blinking signal for flashing the left turn indicator light is input to the turn indicator control circuit, the turn indicator control circuit flashes the left turn indicator light. In addition, when a turn-off indicator signal for turning off the left turn indicator light is input to the turn indicator control circuit, the turn indicator control circuit turns off the left turn indicator light. In this manner, the turn indicator 80 is controlled to flash and turn off by the vehicle control device 100, in addition to manual operations from the driver of the host vehicle.

The vehicle control device 100 will be described next. The vehicle control device 100 according to the present embodiment comprises a computer provided with hardware and software, and is composed of ROM (Read-Only Memory) in which programs are stored, a CPU (Central Processing Unit) that executes the programs stored in the ROM, and RAM (Random-Access Memory) that functions as an accessible storage device. In terms of the operating circuit, an MPU (Micro Processing Unit), a DSP (Digital Signal Processor), an ASIC (Application-Specific Integrated Circuit), a FPGA (Field Programmable Gate Array), etc., may be used in place of or in addition to the CPU. A control device 101 shown in FIG. 1 corresponds to the CPU, which is one example of the control unit and the controller of the present invention. A storage device 110 corresponds to the ROM and the RAM.

In the present embodiment, a configuration in which a program executed by the control device 101 is stored in the storage device 110 in advance is described as an example, but the location where the program is stored is not limited to the storage device 110. For example, the program may be stored in a portable computer-readable recording medium (such as disk media, flash memory, etc.) that can be read by a computer. In this case, the control device 101 executes a program downloaded from the computer-readable recording medium. In other words, the vehicle control device 100 may be configured to be equipped with only an operating circuit, and to download programs from the outside.

The control device 101 comprises an information acquisition unit 102 that acquires various information, an autonomous travel controller 103 that carries out autonomous travel control of the host vehicle, a course detection unit 104 that detects a road on which it is possible to change course during autonomous travel control, and a control sequence management unit 105 that manages the control sequence relating to the autonomous travel control. The control device 101 executes a program stored in the storage device 110, thereby functioning as each of these function blocks.

In the present embodiment, some of the functions of the control device 101 are divided into three functional blocks and then the functions of the respective functional blocks are described, but the functions of the control device 101 need not necessarily be divided into three blocks, and may be divided into two or fewer functional blocks, or four or more functional blocks. In addition, the generation of the host vehicle travel route is described as being carried out by the navigation controller 33 of the navigation system 30, but the functional block for generating the travel route may be provided in the control device 101. In addition, the functions of the control device 101 are not limited to the functions of the functional blocks described below and may include a function to control the navigation system, for example.

The function of the information acquisition unit 102 will be described. The information acquisition unit 102 acquires various information from each of the surrounding environment sensor group 10, the vehicle sensor group 20, the navigation system 30, the map database 40, and the HMI 50.

The information acquisition unit 102 acquires the host vehicle vicinity information (also referred to as information of the host vehicle surroundings) detected by the surrounding environment sensor group 10. Host vehicle vicinity information includes detection results detected by the radar 11 and images captured by the imaging device 12. In addition, the information acquisition unit 102 acquires information indicating the state of the host vehicle (also referred to as host vehicle internal information) detected by the vehicle sensor group 20. Host vehicle internal information includes the host vehicle's vehicle speed, acceleration, angular velocity, amount of depression of the accelerator pedal, and amount of depression of the brake pedal. Further, the information acquisition unit 102 acquires the current location and travel route of the host vehicle and road traffic information from the navigation system 30. The information acquisition unit 102 also acquires map information (including road information and traffic rule information) from the map database 40. Further, the information acquisition unit 102 acquires information pertaining to the occupant's operation of the HMI 50. For example, the information acquisition unit 102 acquires, as operation information of the HMI 50, information indicating the position in which the turn indicator switch has been placed by the driver (neutral position, left turn signal position, or right turn signal position).

The autonomous travel controller 103 carries out autonomous travel control of the host vehicle based on the current location of the host vehicle, the travel route to the destination, the host vehicle vicinity information, the internal information of the host vehicle, the road traffic information, the map information, and the operation information of the HMI 50 acquired by the information acquisition unit 102. The autonomous travel control executed by the autonomous travel controller 103 includes, for example, "vehicle speed/inter-vehicle distance control," "lane maintenance control," "lane-change assist control," "passing assist control," "route travel assist control," and the like.

The "vehicle speed/inter-vehicle distance control" and the "lane maintenance control" will be described. When the driver operates the HMI 50 to start the autonomous travel control, the autonomous travel controller 103 starts the "vehicle speed/inter-vehicle distance control" and the "lane maintenance control." The "vehicle speed/inter-vehicle distance control" includes the vehicle speed control for controlling the travel speed of the host vehicle In addition, with the "lane maintenance control," the host vehicle is controlled so as to autonomously travel in the vicinity of the center of the lane.

The autonomous travel controller 103 executes vehicle speed control if the surrounding environment sensor group 10 detects that are no preceding vehicles ahead in the host vehicle lane. In this vehicle speed control, the autonomous travel controller 103 controls the travel speed of the host vehicle so as to maintain a vehicle speed set by the driver (hereinafter also referred to as the set vehicle speed). Specifically, the autonomous travel controller 103 controls the accelerator opening degree actuator 72 and the brake control actuator 73 by means of the actuator control device 60 so as to maintain the set vehicle speed while receiving vehicle speed data detected by and fed back from the vehicle speed sensor 21.

The autonomous travel controller 103 executes inter-vehicle distance control if the surrounding environment sensor 10 detects that there is a preceding vehicle ahead in the host vehicle lane. In this inter-vehicle distance control, the autonomous travel controller 103 controls the vehicle speed so as to maintain an inter-vehicle distance in accordance with the vehicle speed, with the driver's set vehicle speed as the upper limit. Specifically, the autonomous travel controller 103 controls the accelerator opening degree actuator 73 and the brake control actuator 72 by means of the actuator control device 60 so as to maintain the set inter-vehicle distance, while receiving inter-vehicle distance data detected by and fed back from the radar 11, and the like. If the preceding vehicle stops during an execution of the inter-vehicle distance control, the autonomous travel controller 103 stops the host vehicle after the preceding vehicle stops. Further, if the preceding vehicle begins to travel within a prescribed period of time after the host vehicle has stopped, the autonomous travel controller 103 reinitiates travel of the host vehicle and restarts the inter-vehicle distance control.

The set vehicle speed of the "vehicle speed/inter-vehicle distance control" may be set by the driver or by the autonomous travel controller 103. The autonomous travel controller 103 may detect the speed limit of the currently traveled road from a road sign by means of the surrounding environment sensor 10, or may acquire the speed limit from the map information of the map database 40, thereby automatically setting the set vehicle speed to the speed limit.

When road markings such as lane markings can be detected by the surrounding environment sensor 10, the autonomous travel controller 103 executes the "lane maintenance control." The autonomous travel controller 103 computes the position of the host vehicle within the host vehicle lane based on road markings such as lane markings detected by the surrounding environment sensor 10. In addition, the autonomous travel controller 103 controls the steering actuator 71 by means of the actuator control device 60 such that the host vehicle travels in the vicinity of the center of the host vehicle lane while the computed position of the host vehicle within the host vehicle lane is fed back to the autonomous travel controller.

The "lane-change assist control" will be described next. In the "lane-change assist control," the host vehicle is controlled so as to carry out lane changes by means of autonomous travel. When it is determined that the driver has operated the turn indicator switch and that prescribed lane-change conditions are satisfied during execution of the "vehicle speed/inter-vehicle distance control" and the "lane maintenance control," the autonomous travel controller 103 initiates the "lane-change assist control." The autonomous travel controller 103 determines whether lane-change conditions are satisfied based on the current location of the host vehicle, the host vehicle vicinity information, the internal information of the host vehicle, the road traffic information, and the map information acquired by the information acquisition unit 102. Examples of lane-change conditions include, but are not limited to, "there is a lane in the lane-change direction," "there is room for the host vehicle to change lanes in the lane designated for the lane change," "the lane marker indicates that it is possible to change lanes," and the like.

When it is determined that lane-change conditions are satisfied, the autonomous travel controller 103 outputs a blink signal to the turn indicator control circuit of the turn indicator 80. The turn indicator control circuit causes the turn indicator light in the lane-change direction to blink in accordance with the blink signal. In addition, the autonomous travel controller 103 computes the position of the host vehicle within the host vehicle lane based on road markings such as lane markings detected by the surrounding environment sensor 10. The autonomous travel controller 103 controls the steering actuator 71, the accelerator opening degree actuator 72, and the brake control actuator 73 by means of the actuator control device 60 such that the host vehicle changes lanes from the lane currently occupied by host vehicle to an adjacent lane while the computed position of the host vehicle is fed back to the autonomous travel controller.

The autonomous travel controller 103 detects whether the host vehicle is changing lanes in the direction indicated by the turn indicator 80 based on the lateral acceleration detected by the acceleration sensor 22, the angular velocity detected by the gyro sensor 23, and the like. When it is detected that the host vehicle is changing lanes, the autonomous travel controller 103 executes a prescribed turn signal-off control. In this turn indicator-off control, the autonomous travel controller 103 determines whether a prescribed turn indicator-off condition has been satisfied, and if it is determined that the turn indicator-off condition has been satisfied, the autonomous travel controller outputs a turn-off indicator signal to the turn indicator control circuit. The turn indicator control circuit turns the turn indicator light off in accordance with the turn-off indicator signal. Once the lane change is completed, the autonomous travel controller 103 executes the "vehicle speed/inter-vehicle distance control" and the "lane maintenance control" from the new lane.

The "passing assist control" will be described next. In the "passing assist control," the host vehicle is controlled so as to pass a preceding vehicle by means of autonomous travel. When the surrounding environment sensor group 10 detects that a preceding vehicle is traveling at a speed below the set vehicle speed of the host vehicle during execution of the "vehicle speed/inter-vehicle distance control" and the "lane maintenance control," and when prescribed suggested passing conditions are satisfied, the autonomous travel controller 103 presents passing information to the driver. Passing information includes suggesting that the driver overtake the preceding vehicle. Examples of suggested passing conditions include, but are not limited to "there is a lane in the lane-change direction," "there is room for the host vehicle to change lanes after a prescribed time, in the lane designated for the lane-change," "the lane marker indicates that it is possible to change lanes," and the like. The passing information may be presented visibly on a display of the navigation system 30 or on the information display of the instrument panel, or be presented audibly via a speaker in the host vehicle.

The autonomous travel controller 103 detects whether the driver agrees with the passing information and is willing to pass the preceding vehicle. Specifically, based on information on the driver's operation of the HMI 50, the autonomous travel controller 103 detects a prescribed consent operation for agreeing to overtake the preceding vehicle, or a prescribed cancel operation for not agreeing to overtake the preceding vehicle.

If the driver's consent operation is detected and it is determined that prescribed passing conditions are satisfied, the autonomous travel controller 103 executes the autonomous travel control for passing the preceding vehicle. The autonomous travel controller 103 determines whether passing conditions are satisfied, based on the current location of the host vehicle, the host vehicle vicinity information, the host vehicle internal information, the road traffic information, and the map information acquired by the information acquisition unit 102. Examples of passing conditions include, but are not limited to, "there is a passing lane," there is space for the host vehicle to change lanes in the passing lane," "the lane marking indicates that it is possible to change lanes," and the like.

When it is determined that passing conditions are satisfied, the autonomous travel controller 103 controls the turn indicator 80 to flash the turn indicator light in the direction of the lane change for passing, in the same manner as in the "lane-change assist control." In addition, the autonomous travel controller 103 controls the steering actuator 71, the accelerator opening degree actuator 72, and the brake control actuator 73 by means of the actuator control device 60 such that the host vehicle changes lanes from the host vehicle lane to an adjacent lane in the same manner as in the "lane-change assist control."

The autonomous travel controller 103 detects whether the host vehicle is changing lanes in the direction indicated by the turn indicator 80, in the same manner as in the "lane-change assist control." When it is detected that the host vehicle is changing lanes, the autonomous travel controller 103 executes a prescribed turn indicator-off control. In this turn indicator-off control, the autonomous travel controller 103 determines whether prescribed turn indicator-off conditions are satisfied, and if it is determined that the turn indicator-off conditions are satisfied, a turn-off indicator signal is output to the turn indicator control circuit. The turn indicator control circuit turns the turn indicator light off in accordance with the turn-off indicator signal. Once the lane change has been completed, the autonomous travel controller 103 executes the "vehicle speed/inter-vehicle distance control" and the "lane maintenance control" from the new lane.

If, after the host vehicle has passed the preceding vehicle, prescribed suggested lane return conditions are satisfied, the autonomous travel controller 103 presents lane return information to the driver. Lane return information includes suggesting that the driver return to the original lane in which the host vehicle was traveling before passing the preceding vehicle. For example, if the host vehicle is traveling in the left lane of a two-lane road with left-hand traffic and changes lanes to the right lane in order to pass a preceding vehicle, a return to the original, left lane is suggested by means of the lane return information. Examples of the suggested lane return conditions include, but are not limited to, the same conditions as the suggested passing conditions. The lane return information may be may be presented visibly on a display of the navigation system 30 or on the information display of the instrument panel, or be presented audibly via a speaker in the host vehicle.

The autonomous travel controller 103 detects whether the driver agrees with the lane return information and is willing to change lanes to the original lane. Specifically, based on information on the driver's operation of the HMI 50, the autonomous travel controller 103 detects a prescribed consent operation for approving the lane change, or a prescribed cancel operation for not approving the lane change. When the driver's consent operation is detected and it is determined that prescribed lane-change conditions are satisfied, the autonomous travel controller 103 controls the turn indicator 80 and the actuator control device 60 in order to change to the original lane, in the same manner as in the "lane-change assist control." Examples of the lane-change conditions include the same conditions as those for the "lane-change assist control." Once the lane change has been completed, the autonomous travel controller 103 executes the "vehicle speed/inter-vehicle distance control" and the "lane maintenance control" from the new lane.

The "route travel assist control" will be described next. In the "route travel assist control," the host vehicle is controlled to carry out autonomous travel in accordance with a set travel route to the destination. When a travel route to the destination has been generated by the navigation system 30 and the "vehicle speed/inter-vehicle distance control" and the "lane maintenance control" are activated, and it is detected that the host vehicle is traveling on an automobiles-only road, such as an expressway, the autonomous travel controller 103 activates the "route travel assist control."

The autonomous travel controller 103 detects points (hereinafter referred to as course change points) on the travel route to the destination where it is necessary to change course (including lane changes), such as branch points, merge point, exits, toll plazas, and the like. Further, if prescribed suggested course-change conditions are satisfied, the autonomous travel controller 103 presents course-change information for suggesting that the driver change course. Examples of suggested course-change conditions include, but are not limited to, "the distance from the current location of the host vehicle to the course change point is within a prescribed distance," "there is room for the host vehicle to change course after a prescribed time, on the road (including the lane) designated for the course change," "the lane marker indicates that it is possible to change course," and the like. The course-change information may be presented visibly on a display of the navigation system 30 or on the information display of the instrument panel, or be presented audibly via a speaker in the host vehicle.

The autonomous travel controller 103 detects whether the driver agrees with the course-change information and is willing to change course. Specifically, based on information on the driver's operation of the HMI 50, the autonomous travel controller 103 detects a prescribed consent operation for approving the change of course, or a prescribed cancel operation for not approving the change of course.

If the driver's consent operation is detected and it is determined that prescribed course-change conditions are satisfied, the autonomous travel controller 103 executes the autonomous travel control for the host vehicle to change course. The autonomous travel controller 103 determines whether the course-change conditions are satisfied based on the current location of the host vehicle, the host vehicle vicinity information, the internal information of the host vehicle, the road traffic information, and the map information acquired by the information acquisition unit 102. Examples of course-change conditions include, but are not limited to, "there is room for the vehicle to change course on the road designated for the course change," "the lane marker indicates that it is possible to change lanes," and the like.

When it is determined that the course-change conditions are satisfied, the autonomous travel controller 103 outputs a blink signal to the turn indicator control circuit of the turn indicator 80 in order to flash the turn indicator light in the direction of the change of course, in the same manner as in the "lane-change assist control." In addition, the autonomous travel controller 103 controls the steering actuator 71, the accelerator opening degree actuator 72, and the brake control actuator 73 by means of the actuator control device 60 such that the host vehicle changes course to the road that is designated for the course change, in the same manner as in the "lane-change assist control."

The autonomous travel controller 103 detects whether the host vehicle is changing course in the direction indicated by the turn indicator 80, in the same manner as in the "lane-change assist control." When it is detected that the host vehicle is changing course, the autonomous travel controller 103 executes a prescribed turn indicator-off control. In the turn indicator-off control, the autonomous travel controller 103 determines whether prescribed turn indicator-off conditions are satisfied, and if it is determined that the turn indicator-off conditions are satisfied, a turn-off indicator signal is output to the turn indicator control circuit. The turn indicator control circuit turns the turn indicator light off in accordance with the turn-off indicator signal.

Once the change of course has been completed the autonomous travel controller 103 changes the content of the autonomous travel control in accordance with the type of road on which the change of course took place. That is, if the change of course is a branch off of or a merge onto an automobiles-only road or a lane change on an automobiles-only road, the autonomous travel controller 103 continues the "route travel assist control." In addition, if the change of course is a course change to an exit or a toll plaza of an automobiles-only road, the autonomous travel controller 103 cancels the "route travel assist control" and executes the "vehicle speed/inter-vehicle distance control" and the "lane maintenance control."

The above-described turn indicator-off control will be described next. In the present embodiment, a "first turn indicator-off control," a "second turn indicator-off control," and a "third turn indicator-off control" are executed as the turn indicator-off control. In the "first turn indicator-off control," the turn indicator 80 is turned off when the host vehicle is changing course in the direction indicated by the turn indicator 80 and it is detected that the host vehicle has crossed a boundary line that separates the roads before and after the change of course. In the "second turn indicator-off control," the turn indicator 80 is turned off when the host vehicle is changing course in the direction indicated by the turn indicator 80 and it is detected that there is a road ahead of the host vehicle that allows a second course change for the host vehicle to change course. In the "third turn indicator-off control," the turn indicator 80 is turned off when a prescribed turn-off time has elapsed time since the blinking of the turn indicator 80 was started.

Figure 2:
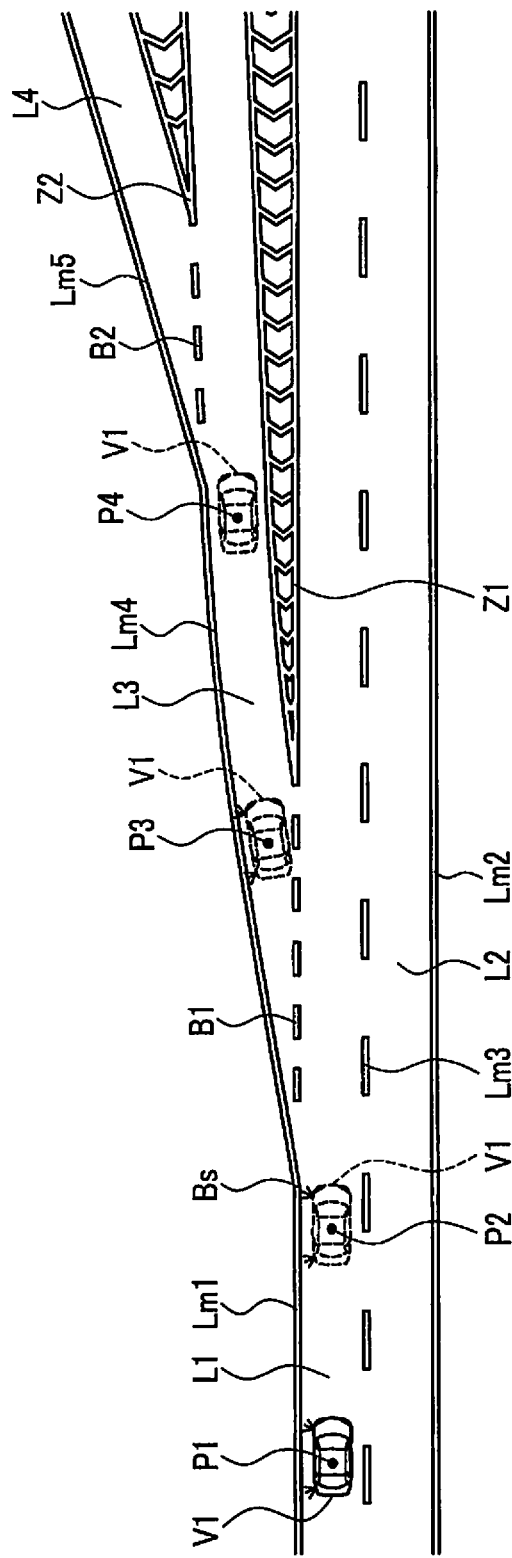
FIG. 2 is an explanatory view showing a state in which a turn indicator-off control is being carried out at the time of a change of course on a road having a first boundary line between the left lane and a first branched road.

The "first turn indicator-off control," the "second turn indicator-off control," and the "third turn indicator-off control" of the present embodiment will be described using the road shown in FIG. 2 as an example. The road shown in FIG. 2 illustrates only the lanes on one side of an automobiles-only road, such as an expressway, that is a left-hand traffic road and that has two lanes on each side. In FIG. 2, vehicles are traveling from left to right. This road is provided with solid lane markers Lm1 and Lm2 indicating lane boundaries on the left side of left-hand lane L1 and the right side of right-hand lane L2. A dashed lane marker Lm3 indicating the boundary between lanes is provided between left-hand lane L1 and right-hand lane L2.

In addition, a first branched road L3 having a different course than the left-hand lane L1 is connected to the left-hand lane L1. A solid lane mark Lm4 indicating the boundary of the first branched road L3 is provided at the left side of the first branched road L3. A buffer zone Z1 for guiding the vehicle to the first branched road L3 is provided between the left-hand lane L1 and the first branched road L3. A connecting portion between the lane marker Lm1 of the left-hand lane L1 and the first branched road L3 is a dashed first boundary line B1 indicating the boundary between the left-hand lane L1 and the first branched road L3.

A second branched road L4 having a different course than the first branched road L3 is connected ahead of the first branched road L3 (toward the right in the figure). A solid lane marker Lm5 indicating the boundary of the second branched road L4 is provided at the left side of the second branched road L4. A buffer zone Z2 for guiding the vehicle to the second branched road L4 is provided between the first branched road L3 and the second branched road L4. A connecting portion between the lane marker Lm4 of the first branched road L3 and the second branched road L4 is a dashed second boundary line B2 indicating the boundary between the first branched road L3 and the second branched road L4.

The vehicle indicated by the solid lines in the figure is a host vehicle V1 equipped with the vehicle system 200 of the present embodiment. The host vehicles V1 indicated by the broken lines in the figure show the positions of the host vehicle V1 after traveling. The radial lines shown on the left side of the host vehicle V1 indicate that the turn indicator 80 is blinking. The first branched road L3 corresponds to one example of a road for carrying out the "first course change" of the present invention. The second branched road L4 corresponds to one example of a "road that allows a second course change for the host vehicle to change course" of the present invention.

On such a road, the host vehicle V1 of the present embodiment changes course from the left-hand lane L1 to the first branched road L3, does not change course at the second branched road L4, and proceeds onto the first branched road L3, by means of the "route travel assist control," for example. On a road in which a plurality of branched roads L3, L4 are relatively close to each other, as in the road shown in FIG. 2, it is necessary to turn the turn indicator 80 off at an appropriate time after the first course change of the host vehicle V1 onto the first branched road L3. If the turn indicator 80 is not turned off at the appropriate time, the host vehicle V1 may reach the next second branched road L4 in a state of continued blinking of the turn indicator 80. If the vehicle reaches the next second branched road L4 in a state of continued blinking of the turn indicator 80, it may give a trailing vehicle the false impression that the host vehicle V1 is going to continue to change course.

The "first turn indicator-off control" will be described first. As shown in FIG. 2, the host vehicle V1 is carrying out autonomous travel on a travel route for changing course from the left-hand lane L1 to the first branched road L3 and proceeding straight on the first branched road L3 by means of the "route travel assist control" carried out by the autonomous travel controller 103 of the present embodiment. The autonomous travel controller 103 detects the first branched road L3 as the course change point described above. If a prescribed suggested course-change condition is satisfied, the autonomous travel controller 103 presents course-change information for suggesting that the driver change course to the first branched road L3. The autonomous travel controller 103 detects whether the driver agrees with the course-change information and is willing to change course. If the driver's consent operation is detected and it is determined that prescribed course-change conditions are satisfied, the autonomous travel controller 103 executes the autonomous travel control for changing the course of the host vehicle V1 to the first branched road L3.

When the current location of the host vehicle V1 reaches position P1, which is before a branch starting point Bs1 of the first branched road L3 by a prescribed period of time (for example, three seconds), the autonomous travel controller 103 outputs a blink signal for flashing the left turn indicator light to the turn indicator control circuit of the turn indicator 80. The connection point between the first branched road L3 and the left-hand lane L1 on the near end in the travel direction is used as the branch starting point Bs, but the connection point between the first branched road L3 and the left-hand lane L1 on the far end in the travel direction may be used, or an intermediate position between the near-end connection point and the far-end connection point may be used.

When the host vehicle V1 reaches position P2 in the vicinity of the branch starting point Bs1 of the first branched road L3, the autonomous travel controller 103 controls the steering actuator 71, the accelerator opening degree actuator 72, and the brake control actuator 73 by means of the actuator control device 60 such that the host vehicle V1 changes course from the left-hand lane L1 to the first branched road L3.

The autonomous travel controller 103 detects whether the host vehicle is changing the course in the direction indicated by the turn indicator 80 based on the lateral acceleration detected by the acceleration sensor 22, the angular velocity detected by the gyro sensor 23, and the like. When it is detected that the host vehicle V1 is changing course, the autonomous travel controller 103 executes the "first turn indicator-off control." If the host vehicle V1 is not equipped with the acceleration sensor 22, the gyro sensor 23, and the like, the autonomous travel controller 103 may analyze a captured image from the front camera 121 and detect whether the host vehicle V1 is changing course in the direction indicated by the turn indicator 80 based on the analysis result. That is, the front camera 121 corresponds to one example of the vehicle sensor of the present invention.

The autonomous travel controller 103 analyzes the captured image from the front camera 121 of the imaging device 12 in order to detect the first boundary line B1 between the left-hand lane L1 and the first branched road L3. In addition, the autonomous travel controller 103 detects the relative positions of the host vehicle V1 and the first boundary line B1 from the analysis result of the captured image in order to determine whether the host vehicle V1 has crossed the first boundary line B1. If it is determined that the host vehicle V1 has crossed the first boundary line B1 (for example, the position indicated by P3 in the figure), the autonomous travel controller 103 determines that the turn indicator-off condition has been satisfied and outputs a turn-off indicator signal to the turn indicator control circuit. The position P3 at which the host vehicle V1 crosses the first boundary line B1 may be the position at which the center of gravity of the host vehicle V1 crosses the first boundary line B1, or the position at which part or all of the host vehicle V1 crosses the first boundary line B1.

In this manner, by means of the "first turn indicator-off control," the first boundary line B1 that divides the roads before and after the change of course of the host vehicle V1 is detected by the front camera 121, and the turn indicator 80 is turned off when it is detected that the host vehicle V1 has crossed the first boundary line B1. Therefore, as shown in FIG. 2, when the host vehicle V1 reaches position P4 in the vicinity of the second branched road L4, because the turn indicator 80 is already turned off, it will not give the false impression to a trailing vehicle that the host vehicle V1 is going to continue to change course.

Figure 3:
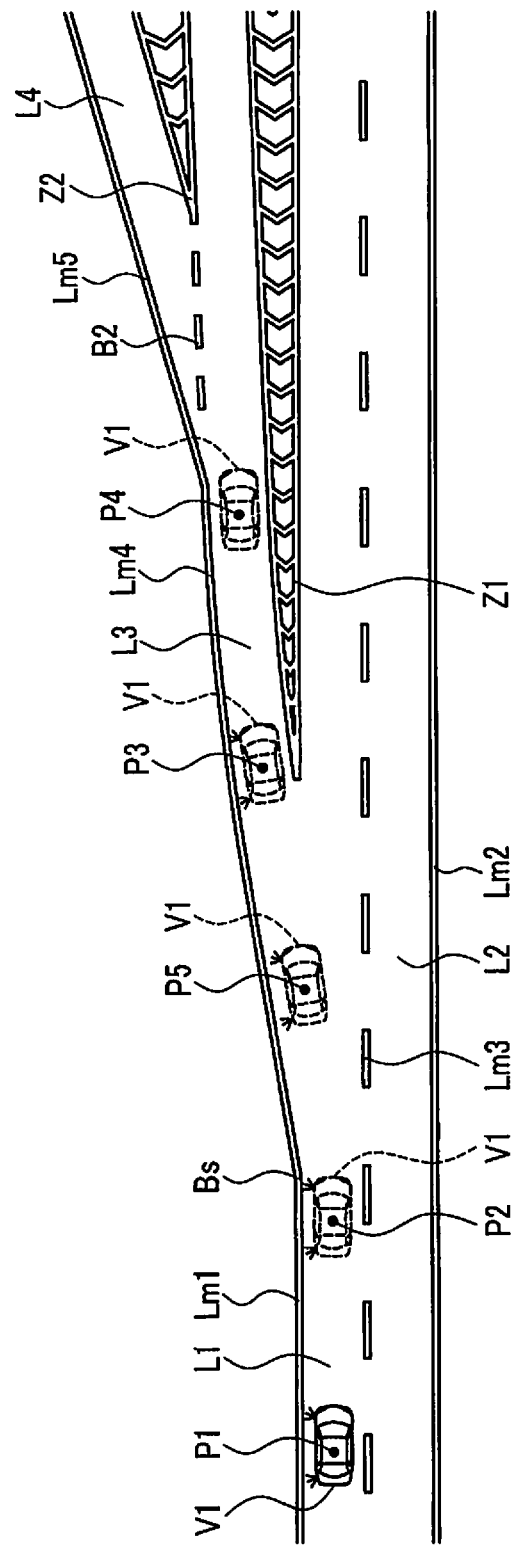
FIG. 3 is an explanatory view showing a state in which a turn indicator-off control is being carried out at the time of a change of course on a road on which the first boundary line between the left lane and a first branched road has disappeared.

The "second turn indicator-off control" will be described next. FIG. 3 shows the same road as the road of FIG. 2, but the first boundary line B1 between the left-hand lane L1 and the first branched road L3 has become weathered and faded due to the passing of many vehicles. The host vehicle V1 is carrying out autonomous travel on a travel route for changing course from the left-hand lane L1 to the first branched road L3 and proceeding straight on the first branched road L3 by means of the "route travel assist control" carried out by the autonomous travel controller 103 of the present embodiment. In the same manner as for the case of the "first turn indicator-off control" described above, if the driver is presented with the course-change information and the driver's consent operation is detected, and it is determined that the prescribed course-change condition has been satisfied, the autonomous travel controller 103 executes the autonomous travel control for host vehicle V1 to change course.

In the same manner as the case described in "first turn indicator-off control" above, when the host vehicle V1 reaches position P1, the autonomous travel controller 103 outputs a blink signal for blinking the left turn indicator light to the turn indicator control circuit. When the host vehicle V1 reaches position P2, the autonomous travel controller 103 controls the steering actuator 71, the accelerator opening degree actuator 72, and the brake control actuator 73 by means of the actuator control device 60 such that the host vehicle V1 changes course from the left-hand lane L1 to the first branched road L3.

The autonomous travel controller 103 detects whether the host vehicle is changing course in the direction indicated by the turn indicator 80 in the same manner as described for the case of the "first turn indicator-off control." When it is detected that the host vehicle is changing course, the autonomous travel controller 103 analyzes the captured image from the front camera 121 of the imaging device 12 in order to detect the first boundary line B1 between the left-hand lane L1 and the first branched road L3. However, in the road shown in FIG. 3, because the first boundary line B1 has become weathered and faded due to the passing of many vehicles, the first boundary line B1 cannot be detected from the captured image. In this manner, boundary lines provided in exit lanes and branched roads are passed over by many vehicles and because the passing locations are limited, they tend to weather and fade, or to disappear altogether, often making their detection difficult. Causes that make it impossible to detect boundary lines of roads before and after changes of course include, in addition to their becoming weathered and faded, the fact that the boundary lines were not there to begin with, the road being too wide so that the boundary lines do not fall within the photographing range of the front camera 121, etc.

When the first boundary line B1 cannot be detected, the autonomous travel controller 103 executes the "second turn indicator-off control" instead of the "first turn indicator-off control." The autonomous travel controller 103 causes the course detection unit 104 shown in FIG. 1 to analyze the captured image from the front camera 121. The course detection unit 104 detects whether there is a road that branches from the road after the first course change ahead of the host vehicle V1, as a road that enables a second course change for changing the course of the host vehicle V1. That is, when the change of course from the left-hand lane L1 to the first branched road L3 is set as the first course change of the host vehicle V1, the autonomous travel controller 103 causes the course detection unit 104 to detect whether there is a road that branches from the first branched road L3, which is the road after the first course change, and that enables the host vehicle V1 to make a second course change.

In the present embodiment, the term branch means a place on a road travelable by a vehicle that splits off into a plurality of roads of different course, or a place where the road splits off. In addition, a road that branches from the road after the first course change means a road that splits off the road after the first course change toward a different course. Thus, the reason for detecting a road that, as a road that enables a second course change for changing the course of the host vehicle V1, branches from the road after the first course change is to prevent a situation in which, for example, the host vehicle V1 changes lanes, as change of course, on a road having three or more lanes on each side, and another lane is detected as a road that enables a second course change during the lane change, with the result that the turn indicator 80 is turned off during the lane change. Lane changes on a road having three lanes or more on each side will be described further below.

If the detection of a road is carried out by the course detection unit 104 on the road shown in FIG. 3, the second branched road L4 is detected as the "road that enables a second course change." That is, the second branched road L4 is a road that branches from the first branched road L3, and a road on which the host vehicle V1 can change course from the first branched road L3. Thus, the second branched road L4 is detected as a "road that enables a second course change." The course detection unit 104 detects a V-shaped buffer zone Z2 between the first branched road L3 and the second branched road L4 from the captured image from the front camera 121, thereby detecting the second branched road L4. The course detection unit 104 may detect the second branched road L4 itself instead of the buffer zone Z2.

The course detection unit 104 detects, as the "road that enables a second course change," a road that exists at a distance suitable for the turn indicator-off control irrespective of the photographable distance of the front camera 121 (or the distance at which it is possible to achieve a resolution of the captured image which allows the detection of a road that enables a second course change). For example, if the photographable distance of the front camera 121 is 100 m, the course detection unit 104 does not detect a road that exists at the photographable distance as the "road that enables a second course change," but rather detects a road that exists at a distance of 10-50 m from the host vehicle V1 as the "road that enables a second course change," for example. The distance range in which the course detection unit 104 detects the "road that enables a second course change" is not limited to 10-50 m, and may be any other distance range, as long as the distance is suitable for the turn indicator-off control. In addition, because the turn indicator-off control is influenced by the travel speed of the host vehicle V1, the turn indicator-off control may be configured to switch the distance range for detecting the "road that enables a second course change" in accordance with the travel speed of the host vehicle V1, for example. Specifically, the distance range for detecting the "road that enables a second course change" may be increased as the travel speed of the host vehicle V1 increases, and the distance range for detecting the "road that enables a second course change" may be decreased as the travel speed of the host vehicle V1 decreases.

In addition, if the host vehicle V1 changes the course to the first branched road L3, the left-hand lane L1 that exists to the right of the first branched road L3 also corresponds to a "road that enables a second course change" but the left-hand lane L1 is not detected as the "road that enables a second course change." As shown by position P5 in FIG. 3, the host vehicle V1 faces to the left of the first branched road L3 when changing course from the left-hand lane L1 to the first branched road L3, so that the front camera 121 does not capture the left-hand lane L1. Thus, the left-hand lane L1 is not detected as a "road that enables a second course change." That is, the course detection unit 104 detects, from the captured image from the front camera 121, a branched road that exists in the direction of the change of course as the "road that enables a second course change."

When the course detection unit 104 detects the second branched road L4 as the "road that enables a second course change," the autonomous travel controller 103 determines that a turn indicator-off condition has been satisfied and outputs a turn-off indicator signal to the turn indicator control circuit. If the first boundary line B1 cannot be detected, it is possible to turn off the turn indicator 80 using the elapsed time from the start of flashing of the turn indicator 80, or a scheduled course change completion time that is set in advance, and the like, without using the "second turn indicator-off control" of the present embodiment. However, depending on the conditions of the road on which the host vehicle V1 is traveling, for example, as shown in FIG. 3, on a road on which the first branched road L3 and the second branched road L4 are continuous and the distance between the first branched road L3 and the second branched road L4 is relatively short, there could arise situations in which the host vehicle V1 cannot turn off the turn indicator 80 before reaching the second branched road L4. In contrast, in the second turn indicator-off control of the present embodiment, the turn indicator 80 is turned off when the second branched road L4 is detected when the host vehicle V1 is changing course on the first branched road L3, so that the turn indicator 80 can be turned off before the host vehicle V1 reaches the second branched road L4.

In addition, in the second turn indicator-off control, the following control is also executed in order to turn off the turn indicator 80 before the second branched road L4. If the course detection unit 104 detects the second branched road L4, the autonomous travel controller 103 calculates a required travel time T for the host vehicle V1 to reach the second branched road L4 (road that enables a second course change) from the current location at prescribed time intervals. The required travel time T is calculated based on the travel speed of the host vehicle V1 and the distance to the second branched road L4 obtained by analyzing the captured image of the front camera 121. In addition, the autonomous travel controller 103 determines whether the required travel time T which decreases as the host vehicle V1 travels has fallen below a prescribed first turn-off time T1 (for example, 5 seconds). If it is determined that the required travel time T has fallen below the first turn-off time T1, the autonomous travel controller 103 determines that a turn indicator-off condition has been satisfied and outputs a turn-off indicator signal to the turn indicator control circuit.

As a result, it is possible to turn off the turn indicator 80 at a position before the second branched road L4 by the first turn-off time T1 (for example, a position 5 seconds before). Further, if the distance from the first branched road L3 to the second branched road L4 is relatively short and it is determined that the required travel time T is already below the first turn-off time T1 at the point in time that the second branched road L4 is detected by the course detection unit 104, the turn indicator 80 is turned off at the time of the detection of the second branched road L4, so, again, the turn indicator 80 can be turned off before the second branched road L4. The timing to turn the turn indicator 80 off is controlled based on the first turn-off time T1 and the required travel time T to the second branched road L4, but the timing to turn the turn indicator 80 off may be controlled based on the distance to the second branched road L4.

Moreover, in the second turn indicator-off control, if, after the course detection unit 104 detects the second branched road L4, the elapsed time since the blinking of the turn indicator 80 was started has reached a prescribed second turn-off time T2 before the required travel time T exceeds the first turn-off time T1, the autonomous travel controller 103 determines that a turn indicator-off condition has been satisfied and turns off the turn indicator 80. The second turn-off time T2 is set in consideration of the time generally required for a change of course, and, for example, the time of approximately twelve seconds to several tens of seconds is used. As a result, when the distance from the first branched road L3 the second branched road L4 is relatively long, it is possible to prevent the turn indicator 80 from blinking until just before the second branched road L4 has been reached.

In this manner, by means of the "second turn indicator-off control," it is possible to turn off the turn indicator 80 at a position before the second branched road L4, even on a road on which the first boundary line B1 between the left-hand lane L1 and the first branched road L3 cannot be detected by the front camera 121. Thus, when the host vehicle V1 reaches the position P4 in the vicinity of the second branched road L4, because the turn indicator 80 is already turned off, it will not give a trailing vehicle the false impression that the host vehicle V1 is going to continue making a change of course.

The "third turn indicator-off control" will be described next. In the road shown in FIG. 4, in contrast to the road shown in FIG. 2, the first boundary line B1 between the left-hand lane L1 and the first branched road L3 has become weathered and faded due to the passing of many vehicles. In addition, the road shown in FIG. 4 does not have the second branched road L4 connected to the first branched road L3. Thus, the autonomous travel controller 103 cannot carry out the "first turn indicator-off control" or the "second turn indicator-off control."

When a turn indicator-off control is performed on such a road, the autonomous travel controller 103 according to the present embodiment executes the "third turn indicator-off control." In the "third turn indicator-off control," the autonomous travel controller 103 determines whether the elapsed time since the blinking of the turn indicator 80 was started at position P1 has exceeded a prescribed third turn-off time T3. The third turn-off time T3 is set in consideration of the time generally required for a change of course, and, for example, a time of approximately twelve seconds to several tens of seconds is used. The third turn-off time may be the same time as the above-described second turn-off time. When the elapsed time since the blinking of the turn indicator 80 was started has exceeded the third turn-off time T3, the autonomous travel controller 103 determines that a turn indicator-off condition has been satisfied, and outputs a turn-off indicator signal to the turn indicator control circuit.

In this manner, by means of the "third turn indicator-off control," it is possible to turn off the turn indicator 80 at an appropriate time after the change of course, even on a road on which the first boundary line B1 between the left-hand lane L1 and the first branched road L3 cannot be detected by the front camera 121, and on which there is no second branched road L4. Therefore, the turn indicator 80 is turned off when the host vehicle V1 reaches the position P4 at which the change of course to the first branched road L3 is completed.

Figure 4:
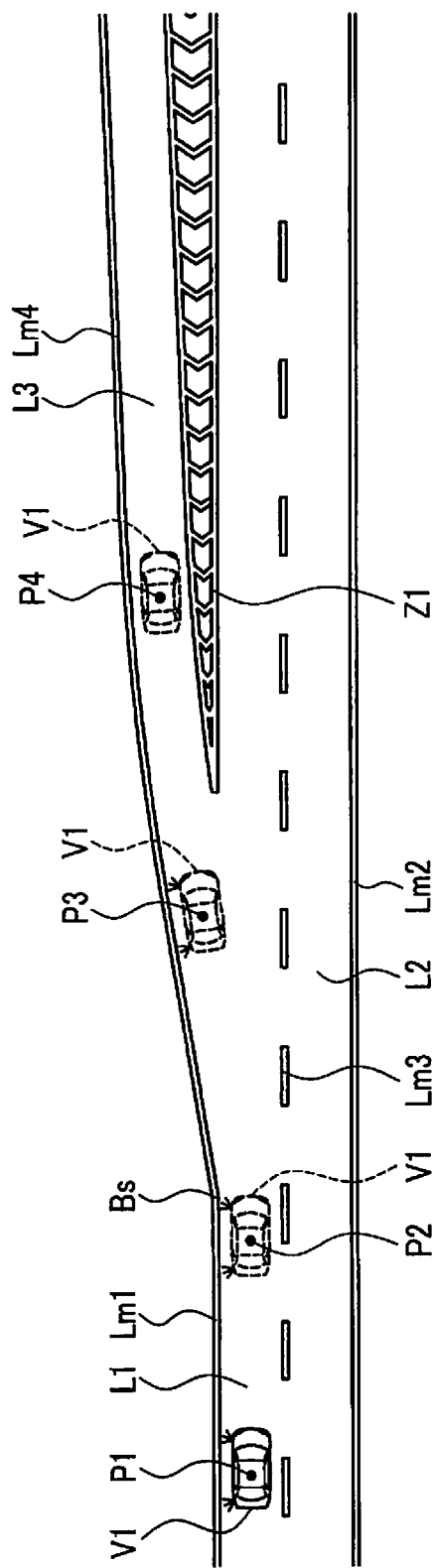
FIG. 4 is an explanatory view showing a state in which a turn indicator-off control is being carried out at the time of a change of course on a road that does not have a first boundary line between the left lane and a first branched road, and that does not have a second branched road.

The turn indicator-off control of the present embodiment can be applied not only to a change of course at branched roads, such as those shown in FIGS. 2-4, but also to a lane change on a road having a plurality of travel lanes. For example, a case in which the host vehicle V1 changes lanes from the right-hand lane L2 to the left-hand lane L1 on a road having two lanes on each side shown in FIGS. 2-4 will be described. In such a lane change, the lane marker Lm3 between the right-hand lane L2 and the left-hand lane L1 becomes the boundary line separating the roads before and after a lane change.

The autonomous travel controller 103 detects whether the host vehicle V1 is changing lanes, as a change of course, in the direction indicated by the turn indicator 80, based on the detection results of the acceleration sensor 22, and the like. When it is detected that the host vehicle is changing lanes in the direction indicated by the turn indicator 80, the autonomous travel controller 103 analyzes the captured image from the front camera 121 in order to detect the lane marker Lm3 between the right-hand lane L2 and the left-hand lane L1. When the lane marker Lm3 can be detected from the captured image, the autonomous travel controller 103 executes the "first turn indicator-off control."

The autonomous travel controller 103 detects the relative positions of the host vehicle V1 and the lane mark Lm3 from the analysis result of the captured image in order to determine whether the host vehicle V1 has crossed the lane marker Lm3. If it is determined that the host vehicle V1 has crossed the lane marker Lm3, the autonomous travel controller 103 determines that the turn indicator-off condition of the "first turn indicator-off control" has been satisfied and outputs a turn-off indicator signal to the turn indicator control circuit.

In addition, if the host vehicle V1 changes lanes from the right-hand lane L2 to the left-hand lane L1 on a road having two lanes on each side as shown in FIGS. 2-4 and the lane marker Lm3 between the right-hand lane L2 and the left-hand lane L1 cannot be detected from the captured image from the front camera 121, the autonomous travel controller 103 executes the "second turn indicator-off control."

The autonomous travel controller 103 causes the course detection unit 104 to analyze the captured image from the front camera 121 and detects whether there is a road that branches from the road after the first course change ahead of the host vehicle V1, as a road that enables a second course change for the host vehicle V1 to change course. That is, when the lane change from the right-hand lane L2 to the left-hand lane L1 is set as the first course change of the host vehicle V1, the autonomous travel controller 103 causes the course detection unit 104 to detect whether there is a road that branches off the left-hand lane L1, which is the road after the first course change.

If the detection of a road is carried out by the course detection unit 104 on the roads shown in FIGS. 2-4, the first branched road L3 is detected as the "road that enables a second course change." That is, the first branched road L3 is a road that branches from the left-hand lane L1, and a road onto which the host vehicle V1 can change lanes from the left-hand lane L1. Therefore, the first branched road L3 is detected as a "road that enables a second course change." If the first branched road L3 is detected from the captured image as a "road that enables a second course change," the autonomous travel controller 103 determines that a turn indicator-off condition of the "second turn indicator-off control" has been satisfied and outputs a turn-off indicator signal to the turn indicator control circuit.

Although a detailed description will be omitted, if the lane marker Lm3 cannot be detected on the roads shown in FIGS. 2-4, and the host vehicle V1 changes lanes from the right-hand lane L2 to the left-hand lane L1 at a location where there is no first branched road L3, the "third turn indicator-off control" is executed. In addition, when the host vehicle changes lanes from the left-hand lane L1 to the right-hand lane L2 on the roads shown in FIGS. 2-4, if the lane marker Lm3 can be detected, the "first turn indicator-off control" is executed. In addition, if the lane marker Lm3 cannot be detected when the host vehicle changes lanes from the left-hand lane L1 to the right-hand lane L2, the "third turn indicator-off control" is executed.

Figure 5:
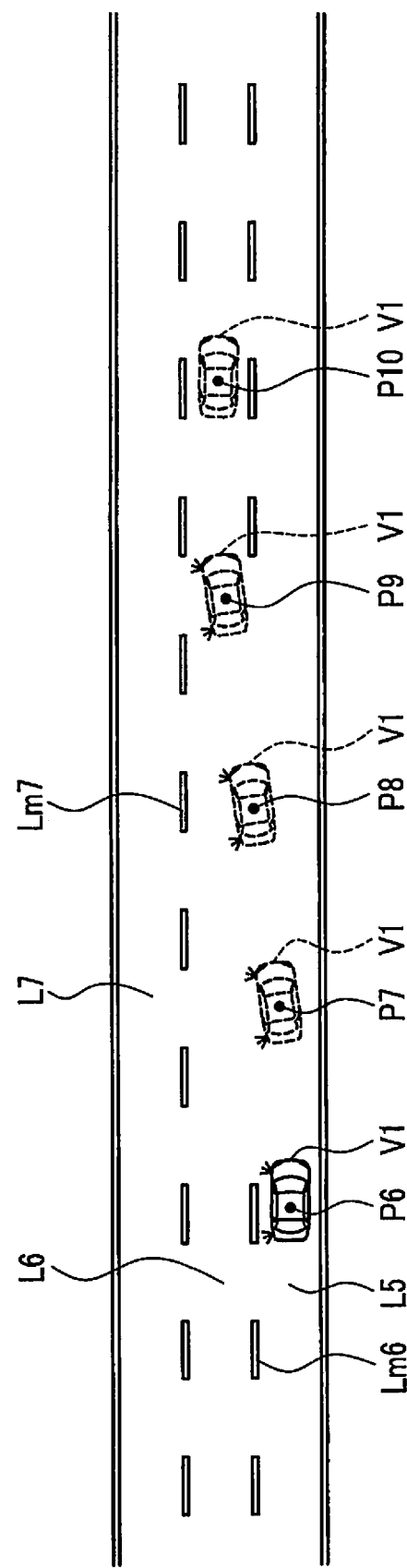
FIG. 5 is an explanatory view showing a state in which a turn indicator-off control is being carried out at the time of a change of course on a road having three lanes on each side.

Turn indicator-off control that is carried out in a case in which the host vehicle V1 changes lanes on a road having three lanes on each side as shown in FIG. 5 will be described next. The road shown in FIG. 5 illustrates only the lanes on one side of an automobiles-only road, such as an expressway, that is a left-hand traffic road and that has three lanes on each side. The host vehicle V1 travels from left to right and changes lane from right-hand lane L5 to center lane L6. In such a lane change, lane marker Lm6 between the right-hand lane L5 and the center lane L6 becomes the boundary line separating the roads before and after the lane change.

The autonomous travel controller 103 detects whether the host vehicle V1 is changing lanes, as a change of course, in the direction indicated by the turn indicator 80, based on the detection results of the acceleration sensor 22, and the like. When it is detected that the host vehicle V1 is changing lanes, the autonomous travel controller 103 analyzes the captured image from the front camera 121 in order to detect the lane marker Lm6 between the right-hand lane L5 and the center lane L6. When the lane marker Lm6 can be detected from the captured image, the autonomous travel controller 103 executes the "first turn indicator-off control" in the same manner as described above. Further, as shown in FIG. 5, when part of the lane marker Lm6 has become weathered and faded, the autonomous travel controller 103 cannot detect the lane marker Lm6 from the captured image, and since there is no road that branches from the center lane L6 after the change of course, the "third turn indicator-off control" is executed.

The autonomous travel controller 103 causes the course detection unit 104 to analyze the captured image from the front camera 121 and detects whether there is a road that branches from the road after the first course change ahead of the host vehicle V1, as a road that enables a second course change for the host vehicle V1 to change course. That is, when the lane change from the right-hand lane L5 to the center lane L6 is set as the first course change of the host vehicle V1, the autonomous travel controller 103 causes the course detection unit 104 to detect whether there is a road that branches from the center lane L6, which is the road after the first course change.

If the detection of a road is carried out by the course detection unit 104 on the road shown in FIG. 5, a "road that enables a second course change" is not detected. That is, although a left-hand lane L7 adjacent to the center lane L6 is a road onto which the host vehicle V1 can change lanes from the center lane L6, it is not a road that branches from the center lane L6. Therefore, the left-hand lane L7 is not detected as a "road that enables a second course change." The course detection unit 104 may detect the left-hand lane L7 itself, or detect the left-hand lane L7 based on lane marker Lm7 between the center lane L6 and the left-hand lane L7.

When viewed from the center lane L6 on which the host vehicle V1 travels after a lane change, the right-hand lane L5 also corresponds to a "road that enables a second course change," but the right-hand lane L5 is not detected as a "road that enables a second course change." As indicated by positions P7-P9 in FIG. 5, when changing lanes from the right-hand lane L5 to the center lane L6, the host vehicle V1 is oriented to the left of the center lane L6, and hence the front camera 121 does not capture the right-hand lane L5. Thus, the right-hand lane L5 is not detected as a "road that enables a second course change." That is, from the captured image of the front camera 121, the course detection unit 104 detects the lane in the direction of the change of course as the "road that enables a second course change."

If a road that enables a second course change for the host vehicle V1 is not detected by the course detection unit 104, the autonomous travel controller 103 executes the "third turn indicator-off control." That is, when the host vehicle changes lanes on a road having three or more lanes on each side, the autonomous travel controller 103 executes the "third turn indicator-off control" if a road that branches in the direction of the lane change as viewed from the lane after the lane change is not detected. In the "third turn indicator-off control," the autonomous travel controller 103 determines whether the elapsed time since the blinking of the turn indicator 80 was started has exceeded a prescribed third turn-off time T3. When the elapsed time since the blinking of the turn indicator 80 was started has exceeded the third turn-off time T3, the autonomous travel controller 103 determines that a turn indicator-off condition has been satisfied and outputs a turn-off indicator signal to the turn indicator control circuit.

As described above, the reason for detecting a road that branches from the road after the first course change as a road that enables a second course change for the host vehicle V1 to change course is to prevent the turn indicator 80 from turning off during the lane change due to the "second turn indicator-off control." That is, in the "second turn indicator-off control," if the left-hand lane L7 is detected as a "road that enables a second course change" by the course detection unit 104 when the host vehicle V1 is changing lanes from the right-hand lane L5 to the center lane L6, the blinking of the turn indicator 80 is turned off during the lane change. However, by detecting a road that branches from the road after the first course change as a road that enables a second course change for the host vehicle V1 to change course, it becomes possible to prevent the turn indicator 80 from turning off during the lane change because the "third turn indicator-off control" is executed on a road with a plurality of lanes, as is shown in FIG. 5. Although a detailed description will be omitted, when a lane change is executed from the left-hand lane L7 to the center lane L6, because the right-hand lane L5 is not detected as a road that branches from the center lane L6, the "second turn indicator-off control" is not executed.

Figure 6:
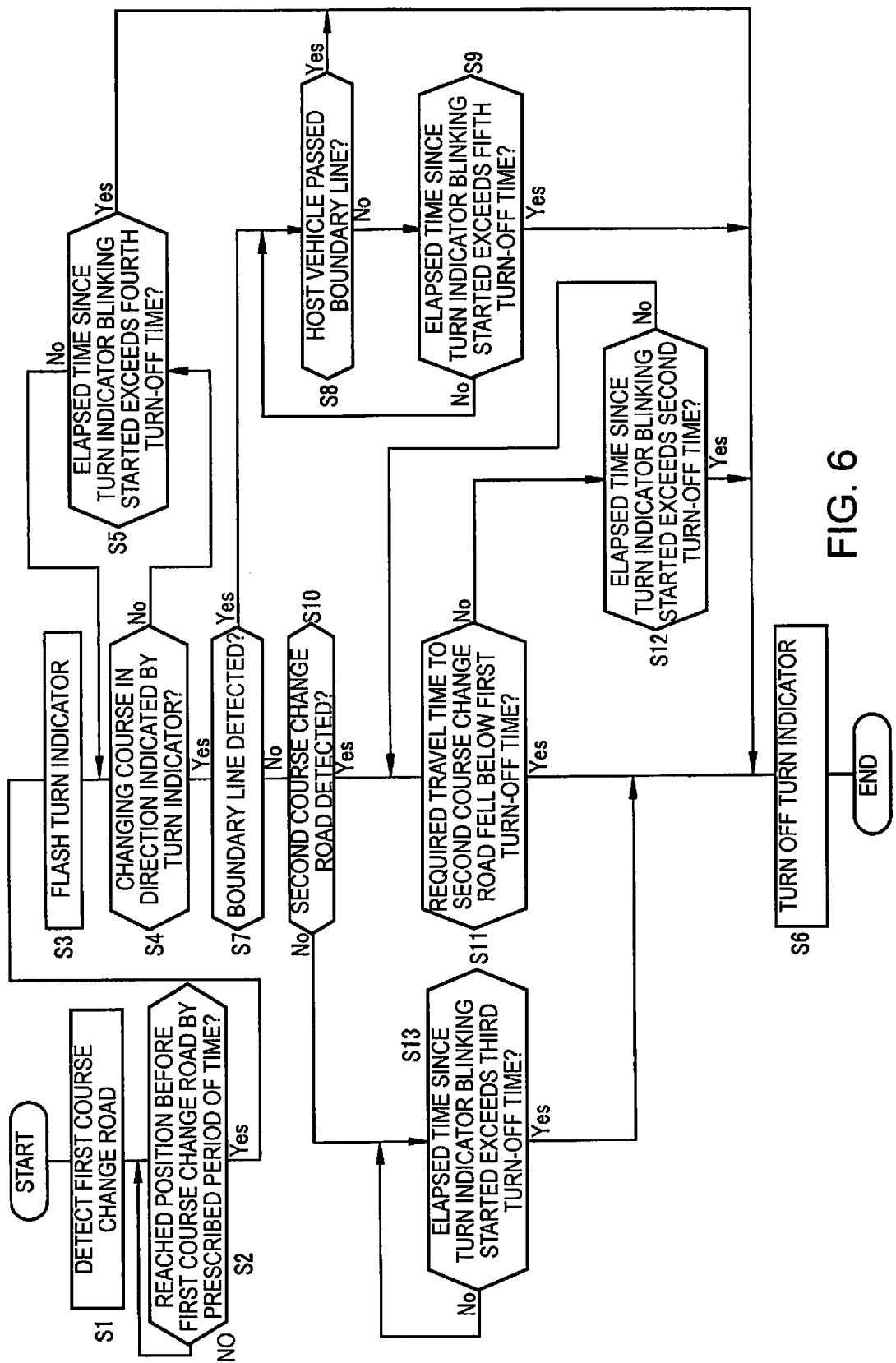
FIG. 6 is a flowchart illustrating the procedure of a turn indicator-off control according to the present embodiment.

The operation of the turn indicator-off control according to the present embodiment will be described next with reference to the flowchart shown in FIG. 6. The autonomous travel controller 103 detects, from a travel route generated by the navigation system 30 on the roads shown in FIGS. 2-4, the first branched road L3 as a course change point (road for carrying out the first course change, hereinafter also referred to as first course change road) (Step S1). The autonomous travel controller 103 determines whether the host vehicle V1 has reached position P1, which is before the branch starting point Bs1 of the first branched road L3, by a prescribed period of time (for example, three seconds) (Step S2), and, when it is determined that the host vehicle V1 has reached the position P1, outputs a blink signal for blinking the left turn indicator light to the turn indicator control circuit of the turn indicator 80 (Step S3).

When the host vehicle V1 reaches position P2 in the vicinity of the branch starting point Bs1 of the first branched road L3, the autonomous travel controller 103 controls the steering actuator 71, the accelerator opening degree actuator 72, and the brake control actuator 73 by means of the actuator control device 60 such that the host vehicle V1 changes course from the left-hand lane L1 to the first branched road L3.

The autonomous travel controller 103 detects whether the host vehicle is changing course in the direction indicated by the turn indicator 80 based on the lateral acceleration detected by the acceleration sensor 22, the angular velocity detected by the gyro sensor 23, and the like (Step S4).

There is the possibility that the change of course of the host vehicle V1 will not be detected after the blinking of the turn indicator 80 has started. Examples of such cases include changes of course of the host vehicle V1 that cannot be detected due to a malfunction of the acceleration sensor 22, the gyro sensor 23, or the like, or the host vehicle V1 not being able to change course due to a malfunction of the actuator control device 60 or of the various actuators 71-73 and continuing to travel straight in the current lane. If the driver is driving the vehicle manually, there may be cases in which the vehicle passes the course change point due to the driver error, so that a change of course in the direction indicated by the turn indicator 80 cannot be executed. Given such situations, in Step S4, if it is not detected that the host vehicle V1 is changing course in the direction indicated by the turn indicator 80, the autonomous travel controller 103 determines whether the elapsed time since the blinking of the turn indicator 80 was started has exceeded a prescribed fourth turn-off time T4 (Step S5).

If the elapsed time since the blinking of the turn indicator 80 was started has exceeded the fourth turn-off time T4 in Step S5, the autonomous travel controller 103 outputs a turn-off indicator signal to the turn indicator control circuit of the turn indicator 80 (Step S6). The fourth turn-off time T4 is set in consideration of the time generally required for a change of course, and, for example, a time of approximately twelve seconds to several tens of seconds is used. In addition, the fourth turn-off time T4 is set longer than the prescribed period of time in which the lighting of the turn indicator 80 is started in Step S2, so that the turn indicator 80 is not turned off before the host vehicle V1 starts to change course.

Returning to Step S4, when it is detected that the host vehicle is changing course, the autonomous travel controller 103 analyzes the captured image from the front camera 121 in order to detect the first boundary line B1 between the left-hand lane L1 and the first branched road L3 (Step S7).

If the first boundary line B1 is detected from the captured image, the autonomous travel controller 103 detects the relative positions of the host vehicle V1 and the first boundary line B1 from the analysis result of the captured image in order to determine whether the host vehicle V1 has crossed the first boundary line B1 (Step S8).

There is the possibility that it cannot be determined whether the host vehicle V1 has crossed the first boundary line B1 after the detection of the first boundary line B1. For example, there are cases in which the first boundary line B1 is detected from the captured image, but the driver operates the steering wheel in the opposite direction to that indicated by the turn indicator 80 before it is determined that the host vehicle V1 has crossed the first boundary line B1, so that it is no longer possible to determine that the vehicle has crossed the first boundary line B1. There are also cases in which the host vehicle V1 loses track of the first boundary line B1, and the relative positions of the host vehicle V1 and the first boundary line B1 cannot be detected before it is determined that the vehicle has crossed the first boundary line B1. Given such situations, if it cannot be detected that the vehicle has crossed the first boundary line B1 in Step S8, the autonomous travel controller 103 determines whether the elapsed time since the blinking of the turn indicator 80 was started has exceeded a prescribed fifth turn-off time T5 (Step S9).

If the elapsed time since the blinking of the turn indicator 80 was started has exceeded the fifth turn-off time T5 in Step S9, the autonomous travel controller 103 outputs a turn-off indicator signal to the turn indicator control circuit of the turn indicator 80 (Step S6). The fifth turn-off time T5 is set in consideration of the time generally required for a change of course, and, for example, a time of approximately twelve seconds to several tens of seconds is used. In addition, the fifth turn-off time T5 is set longer than the prescribed period of time in which the lighting of the turn indicator 80 is started in Step S2, so that the turn indicator 80 is not turned off before the host vehicle V1 starts the change of course. The fifth turn-off time T5 may be approximately as long as the third turn-off time T3 or the same length as the third turn-off time T3.

Returning to Step S8, if the autonomous travel controller 103 determines that the host vehicle V1 has crossed the first boundary line B1 and that a turn indicator-off condition has been satisfied, a turn-off indicator signal is output to the turn indicator control circuit, thereby turning off the turn indicator 80 (Step S6). The above-described turn indicator-off control corresponds to the above-described first turn indicator-off control.

Next, returning to Step S7, a case in which the first boundary line B1 between the left-hand lane L1 and the first branched road L3 cannot be detected from the captured image of the front camera 121 will be described. If the first boundary line B1 is not detected from the captured image in Step S7, the autonomous travel controller 103 causes the course detection unit 104 to analyze the captured image from the front camera 121 and detects whether there is a road that branches from the road after the first course change, that is, whether there is a second branched road L4 ahead of the host vehicle V1, as a road that enables a second course change for the host vehicle V1 to change course (hereinafter also referred to as second course change road) (Step S10).

If the course detection unit 104 detects the second branched road L4 as a "road that enables a second course change," the autonomous travel controller 103 calculates the required travel time T for the host vehicle V1 to reach the second branched road L4 from its current location at prescribed time intervals, and determines whether the required travel time T has fallen below the first turn-off time T1 (Step S11). If it is determined that the required travel time T has fallen below the first turn-off time T1, the autonomous travel controller 103 determines that a turn indicator-off condition has been satisfied and outputs a turn-off indicator signal to the turn indicator control circuit, thereby turning off the turn indicator 80 (Step S6).

In addition, the autonomous travel controller 103 determines whether the elapsed time since the blinking of the turn indicator 80 was started has exceeded the prescribed second turn-off time T2 before the required travel time T falls below the first turn-off time T1 in Step S11 (Step S12). If it is determined that the elapsed time since the blinking of the turn indicator 80 was started has exceeded the second turn-off time T2 before the required travel time T falls below the first turn-off time T1, the autonomous travel controller 103 determines that a turn indicator-off condition has been satisfied and turns the turn indicator 80 off (Step S6). The turn indicator-off control described above corresponds to the above-described second turn indicator-off control.

A case in which a "road that enables a second course change" could not be detected from the captured image of the front camera 121 in Step S10 will be described next. As described above, cases in which a lane change from the right-hand lane L5 to the center lane L6 is carried out, as well as cases in which a lane change from the left-hand lane L7 to the center lane L6 is carried out on a road having three lanes on each side as shown in FIG. 5 also correspond to cases in which a "road that enables a second course change" cannot be detected, because a road that branches from the road after the first course change is not detected. If the second branched road L4 is not detected in Step S10, the autonomous travel controller 103 determines whether the elapsed time since the blinking of the turn indicator 80 was started has exceeded the prescribed third turn-off time T3 (Step S13). If the elapsed time since the blinking of the turn indicator 80 was started has exceeded the third turn-off time T3, the autonomous travel controller 103 determines that a turn indicator-off condition has been satisfied, and outputs a turn-off indicator signal to the turn indicator control circuit (Step S6). The turn indicator-off control described above corresponds to the above-described third turn indicator-off control.

As described above, by means of the vehicle system 200 according to the present embodiment, it is detected whether the host vehicle V1 is carrying out the first course change for changing the course to the first branched road L3 as indicated by the turn indicator 80, and if it is detected that the host vehicle V1 is carrying out the first course change, it is detected whether there is a road that branches from the road after the first course change as a road that enables the second course change for the host vehicle V1 to change course, from the captured image from the front camera 121 of the host vehicle V1, and when the second branched road L4 is detected as a road that enables the second course change, the turn indicator 80 is turned off. As a result, it is possible to turn off the turn indicator 80 after a change of course, even on a road on which the first boundary line B1 that separates the roads before and after the first course change cannot be detected by the front camera 121. In addition, if the first course change is a lane change and a road that branches from the lane after the lane change is not detected, the turn indicator 80 is not turned off. It is thus possible to prevent the blinking of the turn indicator 80 from turning off while the host vehicle V1 is changing lanes.

If map information is provided, as in the vehicle system 200 of the present embodiment, it is possible to store roads in which successive branched roads exist in the map information in advance. However, by using the captured image from the front camera 121 in order to detect branched roads, as in the present embodiment, it is not necessary to store branched roads data in the map information, so that the storage load on the map information can be reduced. In addition, when using map information, the locational accuracy of the host vehicle V1 could greatly affect the timing for turn off the turn indicator 80. For example, because the locational accuracy of the host vehicle V1 will be less on roads on which signals from GPS satellites are difficult to receive, there is the possibility that the location of the host vehicle V1 on the map information will be misaligned, and the turn indicator 80 cannot be turned off at the appropriate time. In contrast, by detecting a road that enables a second course change using the captured image from the front camera 121, as in the present embodiment, it is possible to turn off the turn indicator 80 at the appropriate time in accordance with various road conditions despite the influence of the locational accuracy of the host vehicle V1. Further, in the present embodiment, since the second branched road L4 is detected from the captured image from the front camera 121 based on the buffer zone Z2, which has a characteristic form, erroneous detection of the second branched road L4 and the turning off the turn indicator 80 become less likely.

Thus, because a road on which the host vehicle V1 can carry out a second lane change is detected by the front camera 121, the vehicle system 200 of the present embodiment can be applied to vehicles equipped with only the front camera 121, for example, vehicles equipped only with the functions of the "vehicle speed/inter-vehicle distance control" and the "lane maintenance control" based on captured images from the front camera 121.

Moreover, by means of the vehicle system 200 according to the present embodiment, if it is detected that the host vehicle V1 is carrying out a first course change to the first branched road L3, the first boundary line B1 separating the roads before and after the first course change is detected from the captured image, and if the first boundary line B1 is not detected, it is determined whether there is the second branched road L4 that enables the second course change from the captured image. Further, if the first boundary line B1 is detected, it is determined whether the host vehicle has passed the first boundary line B1, and if the host vehicle V1 has passed the first boundary line B1, the turn indicator 80 is turned off. As a result, if the first boundary line B1 is detectable, the first boundary line B1 is used to carry out the turn indicator-off control of the turn indicator 80, and if the first boundary line B1 cannot be detected, the turn indicator-off control of the turn indicator 80 can be carried out based on a road that enables a second course change. Therefore, it is possible to switch and execute the turn indicator-off control suitably in accordance with the conditions of the road on which the host vehicle V1 travels.

Further, by means of the vehicle system 200 according to the present embodiment, if the second branched road L4 which enables a second course change is detected, the required travel time T for the host vehicle V1 to reach the second branched road L4 from the current location is calculated, and it is determined whether the required travel time T has fallen below the prescribed first turn-off time T1; if it is determined that the required travel time T has fallen below the first turn-off time T1, the turn indicator 80 is turned off. As a result, the turn indicator 80 can be turned off ahead of the second branched road L4. Furthermore, if the distance from the first branched road L3 to the second branched road L4 is relatively short and the required travel time T has already exceeded the first turn-off time T1 at the time that the second branched road L4 is detected by the course detection unit 104, the turn indicator 80 is turned off at the time of the detection of the second branched road L4; thus, again, the turn indicator 80 can be turned off ahead of the second branched road L4. Therefore, when the host vehicle V1 reaches the position P4 in the vicinity of the second branched road L4, because the turn indicator 80 is already turned off, it will not give a trailing vehicle the false impression that the host vehicle V1 is continuing to make a change of course.

Further, by means of the vehicle system 200 according to the present embodiment, if the elapsed time since the blinking of the turn indicator 80 was started has exceeds the prescribed second turn-off time T2 before the required travel time T falls below the first turn-off time T1, the turn indicator 80 is turned off. As a result, when the distance from the first branched road L3 the second branched road L4 is relatively long, it is possible to prevent the turn indicator 80 from blinking until just before arriving at the second branched road L4.

Further, by means of the vehicle system 200 according to the present embodiment, if the second branched road L4, which enables the second course change, could not be detected by the front camera 121, it is determined whether the elapsed time since the blinking of the turn indicator 80 was started has exceeded the prescribed third turn-off time T3; and if the elapsed time since the blinking of the turn indicator 80 was started has exceeded the third turn-off time T3, the turn indicator 80 is turned off. As a result, it is possible to turn off the turn indicator 80 at an appropriate time after the change of course, even on a road on which the first boundary line B1 between the left-hand lane L1 and the first branched road L3 cannot be detected by the front camera 121, and even on a road on which there is no second branched road L4.

In the embodiment described above, a turn indicator-off control carried out when the host vehicle V1 travels autonomously by means of the "route travel assist control" was described, but the turn indicator-off control of the present embodiment can also be applied when carrying out autonomous travel by means of "lane-change assist control" or "passing assist control." In addition, the turn indicator-off control according to the present embodiment can also be used when the host vehicle V1 changes course by means of the driver manually driving the vehicle without the driver's dependence on autonomous travel control.

Figure 7:
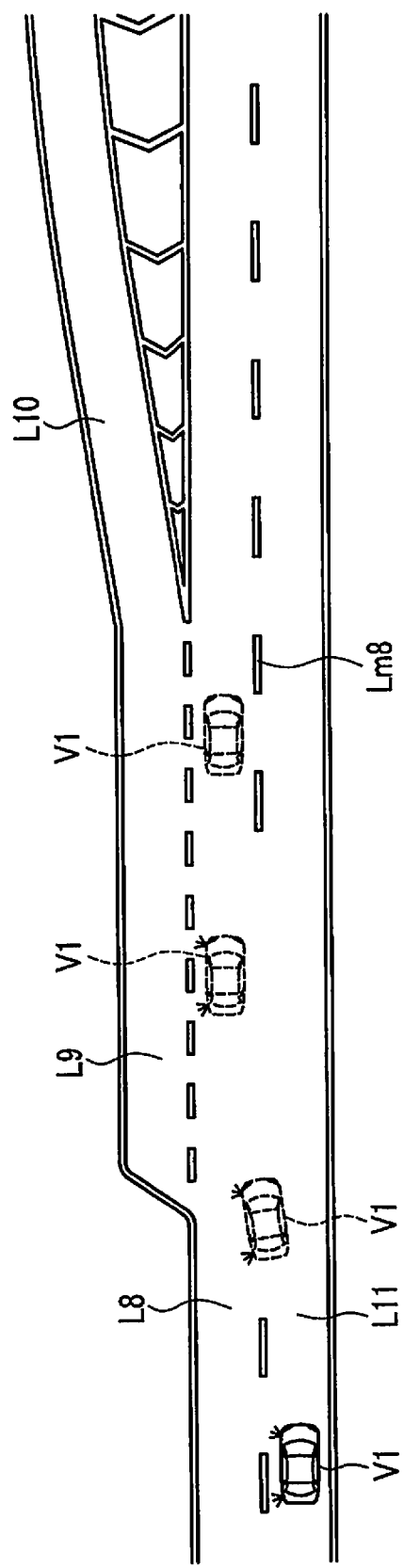
FIG. 7 is an explanatory view showing a state in which a turn indicator-off control is being carried out at the time of a change of course on a road having an exit lane and a branched road toward an exit.

Further, as shown in FIG. 7, the turn indicator-off control according to the present embodiment can also be applied to a road on which there is an exit lane L9 for entering an expressway exit on the left side of a left-hand lane L8, and on which there is a branched road L10 on which the expressway exit is provided ahead of the exit lane L9. On such a road, a change of course from right-hand lane L11 to left-hand lane L8 corresponds to the first course change, and the exit lane L9 corresponds to a road that enables a second course change. Thus, even if boundary marker Lm8 between the right-hand lane L11 and the left-hand lane L8 has become weathered and faded or has disappeared altogether, it is possible to detect the exit lane L9 from a captured image from the front camera 121 in order to turn the turn indicator 80 off.

Figure 8:
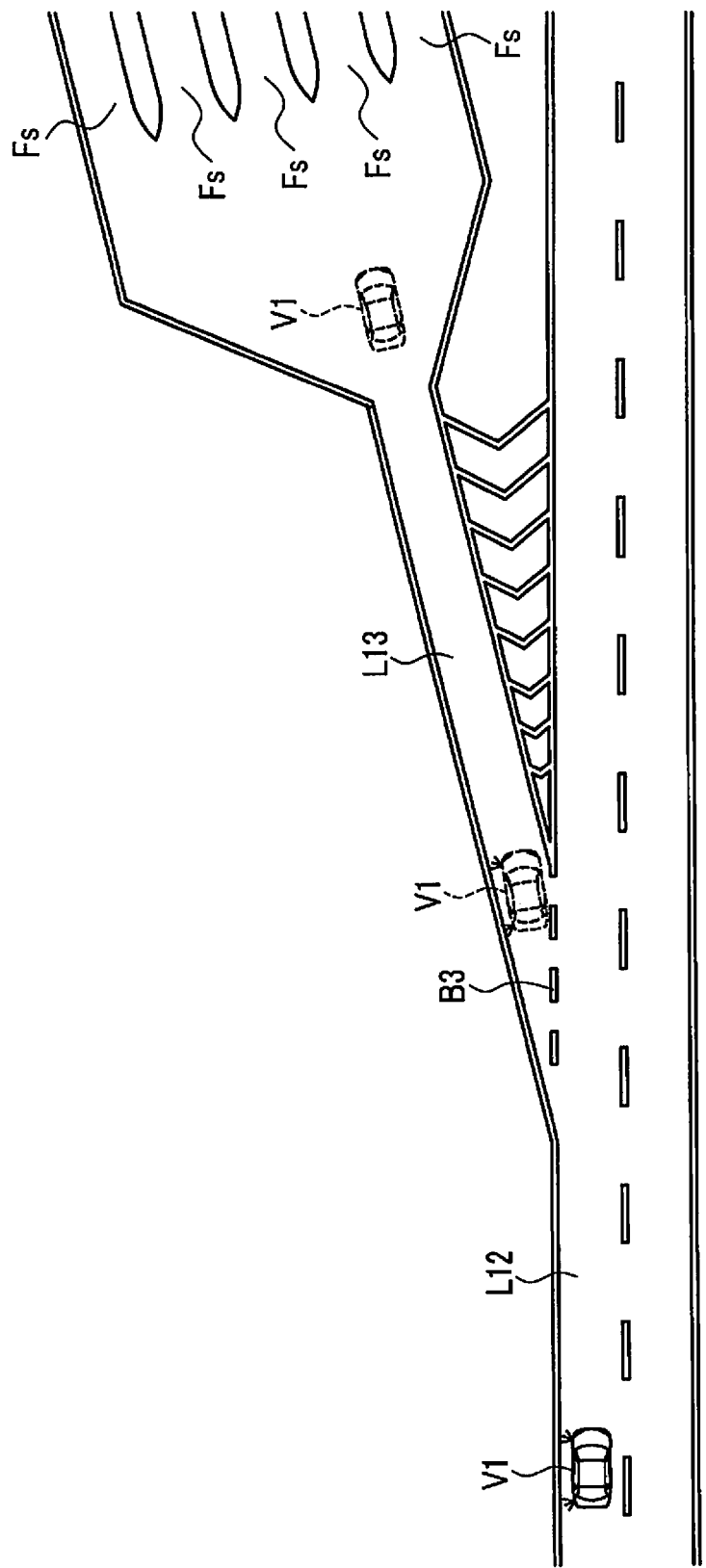
FIG. 8 is an explanatory view showing a state in which a turn indicator-off control is being carried out at the time of a change of course on a road having a plurality of toll booths in front of a branched road.

Further, as shown in FIG. 8, the turn indicator-off control of the present embodiment can also be applied to a road on which there is a plurality of toll booths Fs ahead of a branched road L13 connected to a left-hand lane L12. On such a road, a change of course from the left-hand lane L12 to the branched road L13 corresponds to the first course change, and the plurality of toll booths Fs corresponds to a road that enables a second course change. Thus, even if a boundary line B3 between the left-hand lane L12 and branched road L13 has become weathered and faded or has disappeared altogether, it is possible to detect the plurality of toll booths Fs from a captured image from the front camera 121 in order to turn the turn indicator 80 off.

The invention claimed is:

1. A vehicle control method for turning off a blinking of a turn indicator that indicates a direction of a change of course of a host vehicle, the vehicle control method comprising:
   using a controller, the controller being operatively connected to the turn indicator, a vehicle sensor of the host vehicle, and a front camera of the host vehicle, to execute
      detecting, based on a detection result of the vehicle sensor, whether the host vehicle is carrying out a first course change for changing a course in a direction indicated by the turn indicator;
      upon detecting that the host vehicle is carrying out the first course change, detecting whether there is a boundary line that separates roads before and after the first course change,
      upon detecting the boundary line, determining whether the host vehicle has passed the boundary line, and turning the turn indicator off upon determining that the host vehicle has passed the boundary line, and
      upon detecting that the host vehicle is carrying out the first course change and determining that the boundary line is not detected, detecting, based on an image captured by the front camera, whether there is a road that enables a second course change for changing the course of the host vehicle that branches from the road after the first course change, and turning the turn indicator off upon detecting the road that enables the second course change based on the image captured by the front camera.

2. The vehicle control method according to claim 1, wherein
   upon detecting the road that enables the second course change, calculating a required travel time for the host vehicle to reach the road that enables the second course change upon detecting the road that enables the second course change,
   determining whether the required travel time has fallen below a prescribed first turn-off time, and
   upon determining that the required travel time has fallen below the first turn-off time, the turn indicator is turned off.

3. The vehicle travel control method according to claim 2, wherein
   upon determining that an elapsed time since the blinking of the turn indicator was started has exceeded a second turn-off time before the required travel time falls below the first turn-off time, the turn indicator is turned off.

4. The vehicle control method according to claim 1, wherein
   when the road that enables the second course change is not detected, determining whether the elapsed time since the blinking of the turn indicator was started has exceeded a third turn-off time, and
   upon determining that the elapsed time since the blinking of the turn indicator was started has exceeded the third turn-off time, the turn indicator is turned off.

5. A vehicle control device comprising:
   a turn indicator that indicates a direction of a change of course of a host vehicle by blinking;
   a vehicle sensor that detects a course change of the host vehicle and the direction of the course change;
   a front camera disposed on the host vehicle and arranged to photograph an area ahead of the host vehicle; and
   a controller configured to turn off the turn indicator,
   the controller being configured to
   detect whether the host vehicle is carrying out a first course change for changing the course in a direction indicated by the turn indicator based on a detection result of the vehicle sensor,
   upon detecting that the host vehicle is carrying out the first course change, detect whether there is a boundary line that separates roads before and after the first course change,
   upon detecting the boundary line, determine whether the host vehicle has passed the boundary line and turn the turn indicator off upon determining that the host vehicle has passed the boundary line, and
   upon detecting that the host vehicle is carrying out the first course change and determining that the boundary line is not detected, detect, based on an image captured by the front camera to detect, whether there is a road that enables a second course change for changing the course of the host vehicle that branches from the road after the first course change, and turn off the turn indicator when the road that enables the second course change is detected based on the image captured by the front camera.

\* \* \* \* \*